United States Patent
Chien et al.

(10) Patent No.: US 10,218,975 B2
(45) Date of Patent: Feb. 26, 2019

(54) TRANSFORM PRECISION MANIPULATION IN VIDEO CODING

(71) Applicant: QUALCOMM Incorporated, San Diego, CA (US)

(72) Inventors: Wei-Jung Chien, San Diego, CA (US); Chao Pang, Marina del Rey, CA (US); Li Zhang, San Diego, CA (US); Jianle Chen, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 79 days.

(21) Appl. No.: 15/278,855

(22) Filed: Sep. 28, 2016

(65) Prior Publication Data
US 2017/0094274 A1 Mar. 30, 2017

Related U.S. Application Data

(60) Provisional application No. 62/234,589, filed on Sep. 29, 2015.

(51) Int. Cl.
*H04N 7/12* (2006.01)
*H04N 19/124* (2014.01)
(Continued)

(52) U.S. Cl.
CPC .......... *H04N 19/124* (2014.11); *H04N 19/11* (2014.11); *H04N 19/119* (2014.11);
(Continued)

(58) Field of Classification Search
CPC .... H04N 19/11; H04N 19/119; H04N 19/122; H04N 19/124; H04N 19/126;
(Continued)

(56) References Cited

U.S. PATENT DOCUMENTS

| | | |
|---|---|---|
| 2013/0064290 A1 | 3/2013 | Kung et al. |
| 2014/0198855 A1 | 7/2014 | Sole Rojals et al. |
| 2015/0071359 A1 | 3/2015 | Guo et al. |

FOREIGN PATENT DOCUMENTS

| | | |
|---|---|---|
| GB | 2521117 A | 6/2015 |

OTHER PUBLICATIONS

Second Written Opinion from International Application No. PCT/US2016/054397, dated Oct. 24, 2017, 11 pp.
(Continued)

*Primary Examiner* — Farzana Hossain
(74) *Attorney, Agent, or Firm* — Shumaker & Sieffert, P.A.

(57) ABSTRACT

An example device includes a memory device configured to store encoded video data, and processing circuitry coupled to the memory device. The processing circuitry is configured to determine that a rectangular transform unit (TU) of the stored video data includes a number of pixel rows denoted by a first integer value 'K' and a number of pixel columns denoted by a second integer value 'L,' where K has a value equal to an integer value 'm' left shifted by one, and where L has a value equal to an integer value 'n' left shifted by one, to determine that a sum of n and m is an odd number, and based on the sum of n and m being the odd number, to add a delta quantization parameter value to a quantization parameter (QP) value for the rectangular TU to obtain a modified QP value for the rectangular TU.

19 Claims, 14 Drawing Sheets

(51) Int. Cl.
| | |
|---|---|
| H04N 19/44 | (2014.01) |
| H04N 19/50 | (2014.01) |
| H04N 19/91 | (2014.01) |
| H04N 19/159 | (2014.01) |
| H04N 19/176 | (2014.01) |
| H04N 19/119 | (2014.01) |
| H04N 19/122 | (2014.01) |
| H04N 19/129 | (2014.01) |
| H04N 19/593 | (2014.01) |
| H04N 19/11 | (2014.01) |
| H04N 19/463 | (2014.01) |
| H04N 19/126 | (2014.01) |
| H04N 19/43 | (2014.01) |

(52) U.S. Cl.
CPC ......... *H04N 19/122* (2014.11); *H04N 19/126* (2014.11); *H04N 19/129* (2014.11); *H04N 19/159* (2014.11); *H04N 19/176* (2014.11); *H04N 19/43* (2014.11); *H04N 19/44* (2014.11); *H04N 19/463* (2014.11); *H04N 19/50* (2014.11); *H04N 19/593* (2014.11); *H04N 19/91* (2014.11)

(58) Field of Classification Search
CPC .. H04N 19/129; H04N 19/159; H04N 19/176; H04N 19/43; H04N 19/44; H04N 19/463; H04N 19/50; H04N 19/593; H04N 19/09
USPC ............................................ 375/240–240.29
See application file for complete search history.

(56) References Cited

OTHER PUBLICATIONS

International Preliminary Report on Patentability from International Application No. PCT/US2016/054397, dated Jan. 24, 2018, 12 pp.
Cao et al., "Short Distance Intra Coding Scheme for High Efficiency Video Coding," IEEE Transactions on Image Processing, IEEE Service Center, Piscataway, NJ, US, vol. 22, No. 2, Feb. 2013, pp. 790-801.
International Search Report and Written Opinion from International Application No. PCT/US2016/054397, dated Mar. 2, 2017, 21 pp.
Lai et al., "New intra prediction using the correlation between pixels and lines," JCT-VC Meeting, Apr. 15-23, 2010, Dresden, DE, Joint collaborative Team on Video Coding of ISO/IEC JTC1/SC29/WG11 and ITU-TSG.16, No. JCTVC-A025, Apr. 20, 2010, 4 pp.
Lee et al., "Non-CE6: Simplified reference samples padding for intra prediction," JCT-VC Meeting; MPEG Meeting; Geneva, CH (Joint Collaborative Team on Video Coding of ISO/IEC JTC1/SC29/WG11 and ITU-T SG.16), No. JCTVC-G791, Nov. 9, 2011, 7 pp.
Marpe et al., "Context-Based Adaptive Binary Arithmetic Coding in the H.264/AVC Video Compression Standard," IEEE Transactions on Circuits And Systems For Video Technology, vol. 13, No. 7, Jul. 2003, pp. 620-636.
Partial International Search Report from International Application No. PCT/US2016/054397, dated Jan. 3, 2017, 7 pp.
Sharman et al., "CE1: Test 1—Rectangular transform units for 4:2:2 (and AHG7 benchmarks)," JCT-VC Meeting; MPEG Meeting; Jan. 14-23, 2013; Geneva, CH (Joint Collaborative Team on Video Coding of ISO/IEC JTC1/SC29/WG11 and ITU-T SG.16); URL: http://wftp3.itu.int/av-arch/jctvc-site/, No. JCTVC-L0182, Jan. 7, 2013, 5 pp.
Shiodera et al., "Block Based Extra/Inter-Polating Prediction for Intra Coding," Image Processing, 2007, ICIP 2007, IEEE International Conference on IEEE, PI, Sep. 2007, pp. 445-447.
Tabatabai, "Tool Experiment 6: Intra Prediction Improvement," JCT-VC Meeting, Jul. 21-30, 2010, Geneva, CH (Joint Collaborativeteam on Video Coding of ISO/IEC JTC1/SC29/WG11 and ITU-T SG.16 ), No. JCTVC-B306, XP030007711, Aug. 15, 2010, 12 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Cao et al.,"CE6.c Report on Simplification of Short Distance Intra Prediction (SDIP) Method," JCT-VC Meeting; MPEG Meeting; Nov. 21-30, 2011; Geneva, CH; (Joint Collaborative Team on Video Coding of ISO/IEC JTC1/SC29/WG11 and ITU-TSG. 16); No. JCTVC-G556, Nov. 8, 2011, 20 pp.
Cao et al., "CE6.b1 Report on Short Distance Intra Prediction Method," Joint Collaborative Team on Video Coding 4 (JCT-VC) of ITU-T SG16 WP3 and ISO/IEC JTC1/SC29/WG11, Mar. 16-23, 2011, Document: JCTVC-E278, Mar. 23, 2011, 7 pp.

TRANSFORM PRECISION MANIPULATION IN VIDEO CODING

This application claims the benefit of U.S. Provisional Patent Application No. 62/234,589, filed on 29 Sep. 2015, the entire content of which is incorporated herein by reference.

TECHNICAL FIELD

This disclosure relates to video coding, and more particularly to techniques for performing intra-prediction when coding video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

In general, this disclosure describes techniques for intra-coding data using short distance intra-prediction (SDIP). Aspects of this disclosure relate to intra-mode dependent processing order, coded block flag (CBF) prediction, determining last significant coefficient (LSC), and to transform precision manipulation by delta quantization parameter (delta-QP or dQP). Various techniques of this disclosure are described with respect to SDIP-based video coding, although it will be appreciated that the techniques may be applicable to video coding according to other modes, as well.

In one example, a method of decoding encoded video data includes determining that a rectangular transform unit (TU) comprises a number of pixel rows denoted by a first integer value 'K' where K is equal to (1<<n) and a number of pixel columns denoted by a second integer value 'L' where L is equal to (1<<m); determining that a sum of n and m is an odd number; and based on the sum of n and m being the odd number, adding a delta quantization parameter (delta QP) value to a quantization parameter (QP) value for the rectangular TU to obtain a modified QP value for the rectangular TU.

In another example, a video decoding device includes a memory device configured to store encoded video data, and processing circuitry coupled to the memory device. The processing circuitry is configured to determine that a rectangular transform unit (TU) of the encoded video data stored to the memory device comprises a number of pixel rows denoted by a first integer value 'K' where K is equal to (1<<n) and a number of pixel columns denoted by a second integer value 'L' where L is equal to (1<<m); determine that a sum of n and m is an odd number; and based on the sum of n and m being the odd number, add a delta quantization parameter (delta QP) value to a quantization parameter (QP) value for the rectangular TU to obtain a modified QP value for the rectangular TU.

In another example, a video decoding device includes a memory device configured to store encoded video data, and processing circuitry coupled to the memory device. The processing circuitry is configured to determine that a sub-block of the encoded video data stored to the memory device is to be decoded according to short distance intra-prediction (SDIP); to determine an intra-prediction direction associated with the subblock of the encoded video data stored to the memory device; to determine, responsive to a determination that the intra-prediction direction comprises a bottom-left direction, that a processing order for SDIP-based decoding of the subblock comprises a bottom-up processing order; and determine, responsive to a determination that the intra-prediction direction comprises a top-right direction, that the processing order for the SDIP-based decoding of the subblock comprises a right-to-left processing order.

In another example, a method of encoding video data includes determining that a subblock of the video data is to be encoded according to short distance intra-prediction (SDIP); determining an intra-prediction direction associated with the subblock of the video data; and performing one of: responsive to determining that the intra-prediction direction comprises a bottom-left direction, determining that a processing order for SDIP-based encoding of the subblock comprises a bottom-up processing order; or responsive to determining that the intra-prediction direction comprises a top-right direction, determining that the processing order for the SDIP-based encoding of the subblock comprises a right-to-left processing order.

The details of various aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
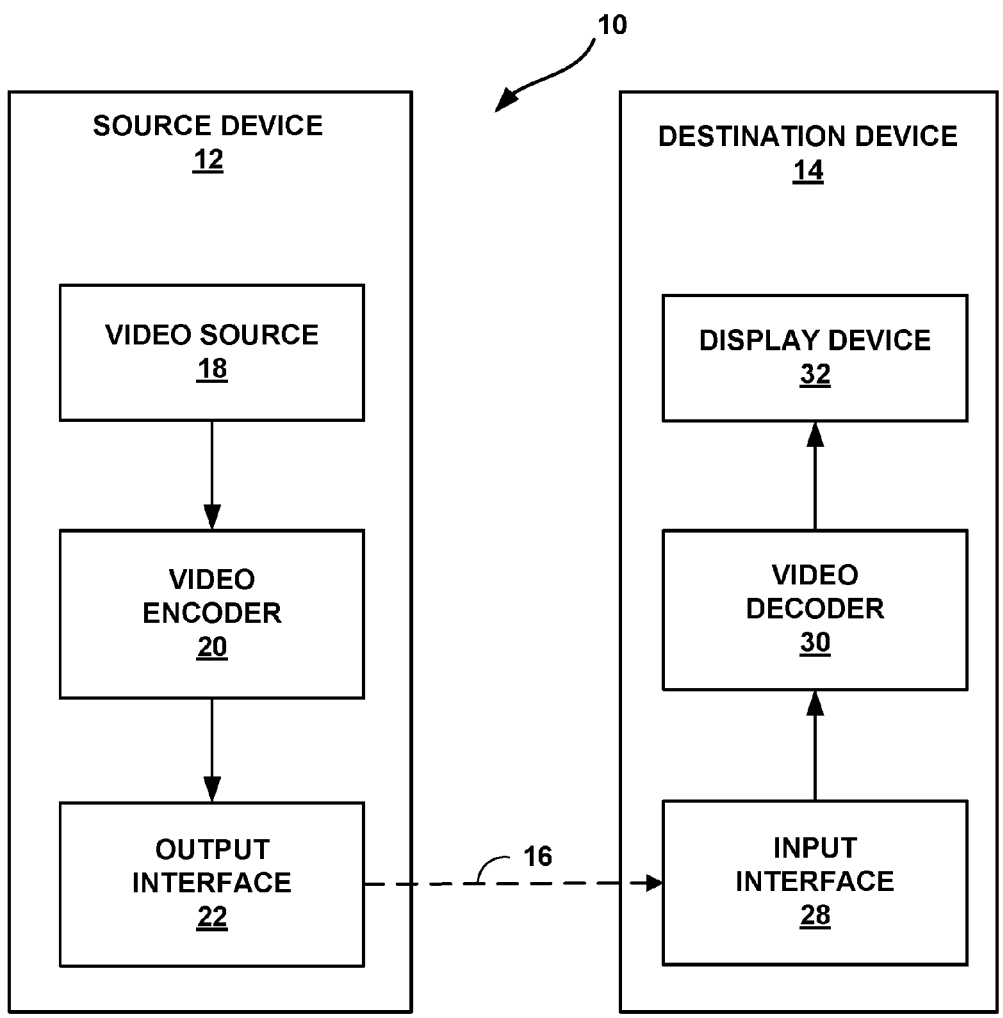
FIG. 1 is a block diagram illustrating an example video encoding and decoding system that may implement the techniques of this disclosure.

Video coding devices implement video compression techniques to encode and decode video data efficiently. Video compression techniques may include applying spatial (intra-frame) prediction and/or temporal (inter-frame) prediction techniques to reduce or remove redundancy inherent in video sequences. A video encoder typically partitions each picture of an original video sequence into rectangular regions referred to as video blocks or coding units (described in greater detail below). These video blocks may be encoded using an intra mode (I-mode) or using an inter mode (P-mode or B-mode).

For P-mode and B-mode, a video encoder first searches for a block similar to the one being encoded in a frame in another temporal location, referred to as a reference frame and denoted as $F_{ref}$. The video encoder may restrict the search to a certain spatial displacement from the block to be encoded. A best match may be located using a two-dimensional (2D) motion vector $(\Delta x, \Delta y)$ where $\Delta x$ is the horizontal and $\Delta y$ is the vertical displacement. Accordingly, the video encoder can construct the predicted block $F_{pred}$ using the motion vector and the reference picture to which the best match belongs according to the following equation:

$$F_{pred}(x,y)=F_{ref}(x+\Delta x,y+\Delta y)$$

where the location of a pixel within the picture is denoted by (x, y).

For blocks encoded in I-mode, the video encoder may form the predicted block using spatial prediction techniques based on data from previously encoded neighboring blocks within the same picture.

In any case, for both I-mode and P- or B-mode, the prediction error, i.e., the difference between the pixel values in the block being encoded and the predicted block, may be represented as a set of weighted basis functions of a discrete transform, such as a discrete cosine transform (DCT). Transforms may be performed using different sizes of blocks, such as 4×4, 8×8 or 16×16 and larger. The shape of a transform block need not always be square. For example, rectangular shaped transform blocks may also be used, e.g. with a transform block size of 16×4, 32×8, etc.

After transformation, the weights (i.e., the transform coefficients) are subsequently quantized. Quantization introduces a loss of information, and as such, quantized coefficients have lower precision than the original transform coefficients. The compression ratio, i.e. the ratio of the number of bits used to represent original sequence and the compressed one, may be controlled by adjusting the value of the quantization parameter (QP) used when quantizing transform coefficients.

The quantized transform coefficients and motion vectors are examples of syntax elements, and, along with control information, form a coded representation of a video sequence. In some instances, the video encoder may entropy code syntax elements, thereby further reducing the number of bits needed for their representation. Entropy coding is a lossless operation aimed at minimizing the number of bits required to represent transmitted or stored symbols (e.g., syntax elements) by utilizing properties of the distribution of the syntax elements (e.g., recognizing that some symbols occur more frequently than others).

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

The Joint Cooperative Team for Video Coding (JCT-VC) has developed a new coding standard referred to as high efficiency video coding (HEVC). In HEVC, a picture may be partitioned into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs. A coding unit (CU) generally refers to an image region that serves as a basic unit to which various coding tools are applied for video compression. A CU usually has a luminance component, denoted as Y, and two chroma components, denoted as U and V.

CUs generally include one or more prediction units (PUs) that describe how data for the CU is predicted. A CU may include information indicating prediction modes for PUs of the CU. For example, information for a CU may indicate prediction modes for one or more portions of the CU. In some examples, a CU may be divided, or partitioned, in to more than one portion for purposes of prediction.

As described in this disclosure, a prediction partition mode (or prediction partitioning mode) may generally refer to the manner in which a block (such as a CU, e.g., a leaf-node CU) is divided for purposes of prediction. For example, assuming that the size of a particular CU is 2N×2N, the CU may be predicted as a whole using a 2N×2N PU (referred to as an 2N×2N partition mode). In another example, the CU may be predicted using four equally sized PUs that are N×N in size (referred to as an N×N partition mode).

Figure 7A:
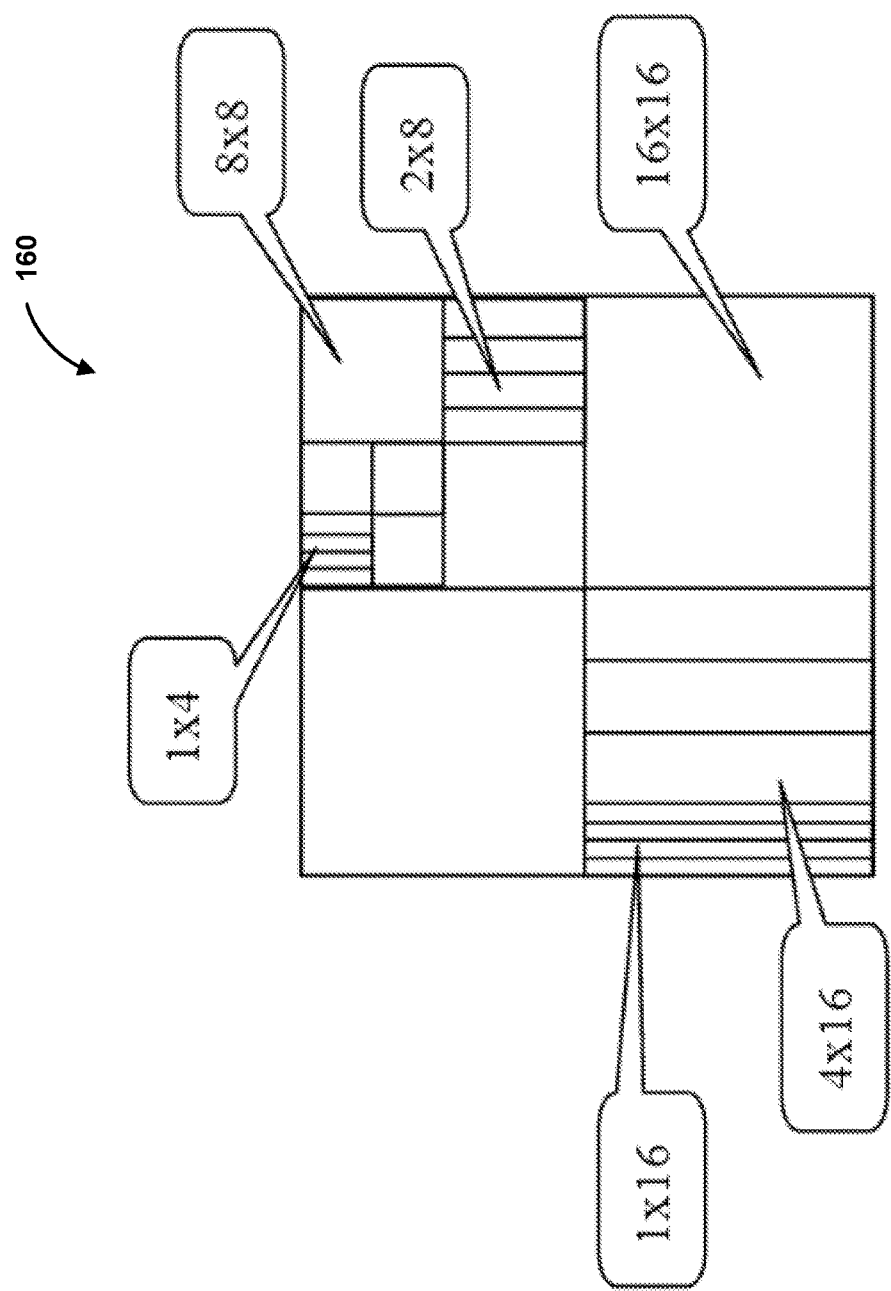
FIG. 7A is a conceptual diagram illustrating a coding unit (CU) that is partitioned into lines or non-square (e.g., rectangular) blocks in accordance with short distance intra-prediction (SDIP).
Figure 7B:
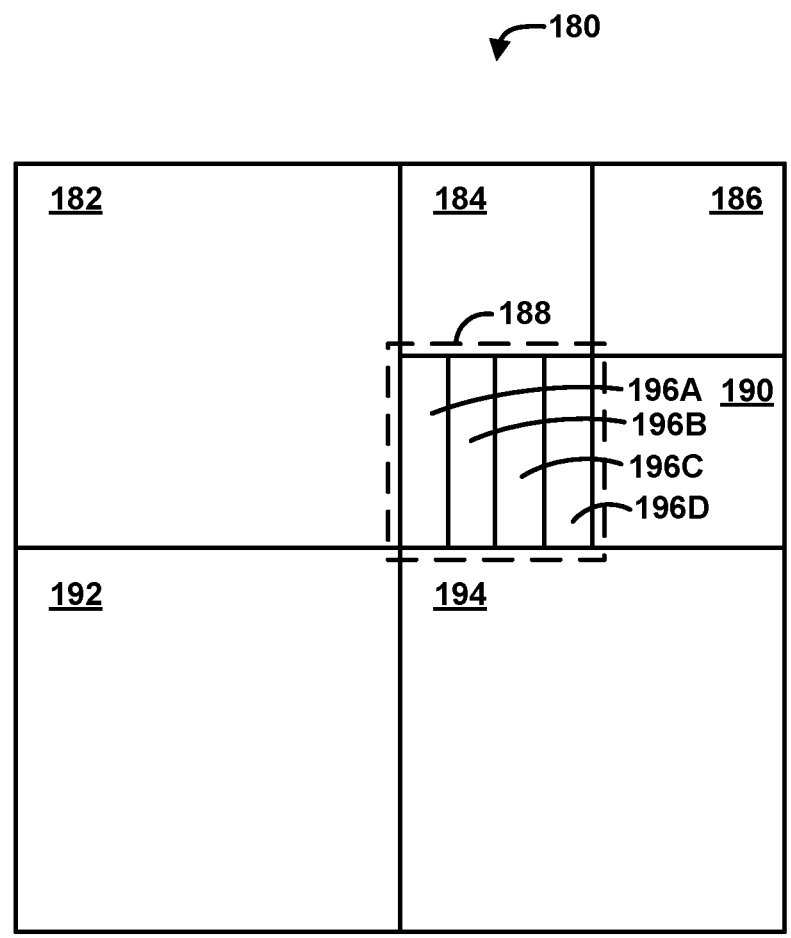
FIG. 7B is a conceptual diagram illustrating an example largest coding unit (LCU) including a short distance intra-prediction (SDIP) predicted CU.

In some examples, short-distance intra-prediction (SDIP) mode may be used for coding intra-predicted blocks. SDIP was described in various references, such as "CE6.c Report on Simplification of Short Distance Intra Prediction (SDIP) Method," JCTVC-G556, November 2011, by X. Cao et al, "Short Distance Intra Coding Scheme for High Efficiency Video Coding," IEEE Transactions on Image Processing, Vol. 22, No. 2, February 2013 by X. Cao et al, and "Short Distance Intra Coding Scheme for HEVC," 2012 Picture Coding Symposium, 7-9 May 2010, by X. Cao et al. SDIP was also studied in HEVC standardization. A technique of SDIP is to divide an N×N block into lines (e.g., single pixel rows or single pixel columns) or non-square blocks, so as to reduce the energy of the prediction residuals by reducing the distance of predicted pixel and its reference pixels. In SDIP modes, one CU that is smaller than a 64×64 dimensionality can be partitioned as lines or non-square blocks with rectangle shape as shown in FIGS. 7A and 7B. FIG. 7A illustrates SDIP block partitions based on the HM and/or on "CE6.c Report on Simplification of Short Distance Intra Prediction (SDIP) Method," JCTVC-G556, November 2011, by X. Cao et al. According to SDIP, one 32×32 CU can be partitioned into four 8×32 PUs or into four 32×8 PUs. Additionally, a 16×16 CU can be divided into four 8×8 PU (as described in the HEVC Test Model "HM"), or may be divided into four 4×16 PUs, or into four 16×4 PUs. Additionally, according to SDIP, a 4×16 PU or a 16×4 PU can be further split into four 1×16 partitions or into four 16×1 partitions. Similarly, one 8×8 CU can be divided into four 2×8 PUs or into four 8×2 PU. In turn, every 4×4 PU can be further divided into four 1×4 partitions or into four 4×1 partitions. Hence, two types of PUs are supported in SDIP. The first supported type of PU is a rectangular PU referred to herein as having either a dimensionality of hN×2N or a dimensionality of 2N×hN. In the description above, 'h' denotes half (½). The second supported type of PU is a line-based PU, referred to herein as having either dimensionality of 1×N or a dimensionality of N×1. For a 32×32 CU, only a rectangular SDIP PU is used. For a 16×16 or an 8×8 CU, both the rectangular and line based PU are supported. For instance, both the rectangular and line-based PUs can be supported for 16×16 and 8×8 CUs according to SDIP, because there are more textures in these kinds of CUs.

According to example SDIP techniques, a video encoder and/or video decoder may divide a CU in parallel, non-square PUs. For example, SDIP techniques may be used to divide a CU into multiple parallel PUs that are 2N×hN or hN×2N in size, where "h" represents one-half. In other words, "hN" is equivalent to N/2. In an example for purposes of illustration, an 8×8 CU may be divided into four 8×2 PUs, where "N×M" refers to N pixels vertically and M pixels horizontally, in this example. In this example, the first PU may be predicted from neighboring pixels to the CU, the second PU may be predicted from neighboring pixels including pixels of the first PU, the third PU may be predicted from neighboring pixels including pixels of the second PU, and the fourth PU may be predicted from neighboring pixels including pixels of the third PU. In this manner, rather than predicting all pixels of the CU from pixels of neighboring, previously coded blocks to the CU, pixels within the CU may be used to predict other pixels within the same CU, using SDIP.

Information regarding partitioning modes may be provided in a variety of ways. For example, partition information, e.g., whether a CU is predicted using PUs sized 2N×2N and N×N for intra-coded blocks, or 2N×2N, 2N×N, N×2N, N×N for inter-coded blocks, may be provided using a partition mode table. The partition mode table may map each of the modes to syntax elements. In some examples, the syntax elements may be bin strings (a binary sting of bits) that may be coded by an entropy coder. In any case, the table may be maintained at both an encoder and a decoder. Accordingly, the partition information for a particular CU can be identified according to an entry in the partition mode table.

In other examples, partition information may be signaled using one or more other syntax elements (not associated with a mode table). For example, a video encoder may provide an indication in an encoded bitstream that SDIP is used to predict a particular CU. Accordingly, a video decoder may determine that the particular CU has been intra-predicted using SDIP upon decoding such signaling. In some examples, the syntax for SDIP modes may include the following elements:

1. SDIP_Flag: a flag for signaling that a CU is encoded as square prediction (2N×2N, N×N) or SDIP type (2N×hN and hN×2N). For example, if SDIP_Flag is equal to zero, the CU is encoded as square prediction unit. However, if SDIP_Flag is equal to one, the CU is encoded using SDIP partitioning.
2. SDIP_direction_Flag: a flag for signaling which SDIP mode is used. For example, if SDIP_direction_Flag is equal to zero, the hN×2N mode may be used. However, if SDIP_direction_Flag is equal to one, the 2N×hN mode may be used.

In the example above, both the SDIP_Flag and SDIP_direction_Flag can be coded using CABAC (context-adaptive binary arithmetic coding).

In the example above, the SDIP_Flag and the SDIP_direction_Flag syntax elements are provided in addition to syntax elements defined by a partition mode table (described above). Moreover, as noted above, the SDIP_Flag and SDIP_direction_Flag may require additional CABAC contexts to be defined and maintained. Accordingly, the signaling of SDIP flags may be relatively computationally intensive and/or costly bit-wise.

FIG. 1 is a block diagram illustrating an example video encoding and decoding system 10 that may utilize techniques for performing one or more of the SDIP coding and/or transform manipulation techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, mobile devices, broadcast receiver devices, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for performing SDIP-based coding and/or for transform size manipulation. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for performing SDIP-based coding and/or for transform size manipulation may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to computer-readable medium 16) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Examples of encoder circuitry and/or decoding circuitry by which video encoder 20 and/or video decoder 30 may implemented include processing circuitry, which may comprise fixed function circuitry, programmable circuitry, or a combination of fixed function circuitry and programmable circuitry. When the techniques are implemented partially in software, a device may store instructions for the software in a suitable, non-transitory computer-readable medium and execute the instructions in hardware using processing circuitry (e.g., one or more processors) to perform the techniques of this disclosure. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, processing circuitry, a microprocessor, and/or a wireless communication device, such as a cellular telephone.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 may operate according to a video compression standard, such as the ITU-T H.264 standard, alternatively referred to as MPEG-4, Part 10, Advanced Video Coding (AVC), or extensions of such standards. The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. Other examples of video compression standards include MPEG-2 and ITU-T H.263.

While the techniques of this disclosure are not limited to any particular coding standard, the techniques may be relevant to the HEVC standard. The HEVC standardization efforts were based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs.

Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

The HM supports prediction in various PU sizes, also referred to as partition modes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N.

The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In some examples, video encoder 20 and video decoder 30 may implement SDIP modes to predict a CU using parallel PUs. In such examples, a CU may be predicted with four SDIP PUs in an hN×2N arrangement, where "h" represents one-half. In other examples, a CU may be predicted with four SDIP PUs in a 2N×hN arrangement. Other partitioning arrangements are also possible, such as those associated with a variety of asymmetric SDIP modes, as described below.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan.

After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

Video encoder 20 may further send syntax data, such as block-based syntax data, frame-based syntax data, and group of pictures (GOP)-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video decoder 30, upon receiving the coded video data, may perform a decoding pass generally reciprocal to the encoding pass described with respect to video encoder 20. Various techniques of this disclosure are described below.

In some aspects, techniques of this disclosure are directed to intra mode dependent processing order. According to example SDIP techniques, the processing order of the sub-blocks is from top-to-bottom and left-to-right. One potential advantage of SDIP is that the reconstructed neighboring pixels tend to be significantly closer to the predicted pixels than in scenarios of normal intra prediction. Because the reconstructed neighboring pixels from which the current pixel is predicted are positioned closer to the current pixel according to SDIP, SDIP may improve the accuracy of the prediction of the current pixel. However, if the SDIP prediction order is always top-down and left-to-right, the reconstructed pixels in the previously coded subblock may not be fully utilized by video decoder 30. For example, if the intra prediction direction is from the bottom-left, the intra prediction always comes from (e.g., is always based on) the bottom-left pixels.

Therefore, the top-down aspect of the processing order may not increase or otherwise improve the prediction accuracy of the current pixel. For instance, according to the top-down nature of SDIP processing order, the bottom-left neighboring pixels may not yet be reconstructed when the current pixel is predicted, and thus, the intra-prediction reference pixels are not available. Similarly, in instances where the intra prediction is from the top-right, the intra prediction always comes from (e.g., is always based on) the top-right pixels. In these scenarios, the left-to-right nature of the SDIP processing order may not increase or otherwise improve the prediction accuracy.

According to aspects of this disclosure, video encoder 20 and/or video decoder 30 may, under various circumstances, change the processing orders for the bottom-left intra prediction and top-right intra prediction to bottom-up and right-to-left, respectively. Stated generally, video encoder 20 and video decoder 30 may change the processing order based on the intra-prediction angle for the current CU. For instance, video encoder 20 and video decoder 30 may implement the techniques of this disclosure to change the processing order, to address scenarios in which reconstructed pixels are not available in accordance with the existing SDIP processing orders.

By implementing the bottom-up processing order in cases of the intra prediction direction being bottom-left, video encoder 20 and video decoder 30 may implement the techniques of this disclosure to increase or improve the prediction accuracy in instances where the intra prediction direction is bottom-left. For example, if the top-down processing order of existing SDIP technology is combined with a bottom-left intra prediction direction, reconstructed pixels from bottom-left blocks or rows may not be available yet (e.g., reconstructed pixels may not have been coded yet). For instance, the pixels from the bottom-left blocks or rows may not have been reconstructed yet due to the processing order provided by existing SDIP technology. As a result, to perform SDIP according to the existing technologies, video encoder 20 and video decoder 30 may need to use pixels that have been reconstructed in another CU, such as a CU that is positioned adjacently to the current CU. As used herein with respect to the description of SDIP-related techniques, the term "bottom-left" when used to describe blocks or rows describes blocks or rows that are positioned below the current CU, and to the left of the current CU. For instance, a "below-left neighboring block" or "below-left neighboring pixel" may be positioned immediately below and immediately to the left of the current CU or pixel.

Similarly, by implementing the right-to-left processing order in cases of the intra prediction direction being top-right, video encoder 20 and video decoder 30 may implement techniques of this disclosure to increase or improve the prediction accuracy in instances where the intra prediction direction is top-right. For example, if the left-to-right processing order of existing SDIP technology is combined with a top-right intra prediction direction, reconstructed pixels from top-right blocks or rows may not be available yet. For instance, the pixels from the top-right blocks or rows may not have been reconstructed yet due to the processing order provided by existing SDIP technology. As a result, to perform SDIP according to the existing technologies, video encoder 20 and video decoder 30 may need to use pixels that have been reconstructed in another CU, such as a CU that is positioned adjacently to the current CU. As used herein with respect to the description of SDIP-related techniques, the term "top-right" when used to describe blocks or rows describes blocks or rows that are positioned above the current CU, and to the right of the current CU.

In instances where existing SDIP technology causes video encoder 20 and/or video decoder 30 to use pixels positioned in a different CU for SDIP-based coding of the current CU, coding accuracy may be compromised. For instance, because the pixel(s) being used for SDIP are positioned farther away from the currently-coded pixels of the current CU than pixels that are generally used when the SDIP processing order provides already-reconstructed pixels in accordance with the intra-prediction direction/angle. Because of the increased distance between the currently-coded pixels of the current CU and the pixel(s) being used for SDIP, the prediction accuracy with respect to the current CU may be diminished, as a greater distance between pixels used for prediction may result in a lowered correlation between the pixels.

Video encoder 20 and video decoder 30 may implement techniques of this disclosure to improve the accuracy of SDIP-based coding. More specifically, video encoder 20 and video decoder 30 may implement the techniques to mitigate or potentially eliminate the increase in pixel-to-pixel distance necessitated by encountering unreconstructed pixels due to certain intra prediction directions/angles, such as those described above. For instance, video encoder 20 and video decoder 30 may switch to a bottom-up and/or right-to-left processing order when performing SDIP-based coding, in response to certain video coding characteristics. For instance, video encoder 20 and video decoder 30 may adapt the processing order of SDIP-based coding based on the use of a particular intra-prediction direction/angle.

Moreover, because the techniques of this disclosure are directed to changing the processing order only in cases of the intra prediction direction being bottom-left or top-right, video encoder 20 and video decoder 30 may maintain the advantages provided by SDIP with respect to the remaining intra prediction directions, while leveraging the changed processing orders to improve accuracy of SDIP based coding in cases where the intra prediction direction is either bottom-left or top-right. Said another way, video encoder 20 and video decoder 30 may implement the SDIP processing order adaptation of this disclosure in scenarios where the adaptation would potentially improve the coding accuracy provided by SDIP-based coding, while adhering to existing SDIP processing orders in scenarios where an adaptation may not yield potential accuracy enhancements. In this manner, the techniques described herein may enable video encoder 20 and video decoder 30 to improve prediction accuracy of SDIP-based coding in certain scenarios without negatively impacting the advantages of SDIP in the remaining scenarios.

Other aspects of the disclosure are directed to coded block flag (CBF) prediction in accordance with SDIP coding. A CBF syntax element indicates whether a block of transform coefficients or block (also referred to as "transform coefficient levels") includes any non-zero transform coefficients or levels. Often, residuals are located at consecutive subblocks. Thus, the CBF value for consecutive subblocks may be the same, in many scenarios. In many instances, the CBF value may be the same for a relatively long run of consecutive subblocks. For instance, several consecutive subblocks may each include at least one non-zero transform coefficient. Thus, the run of subblocks may cause video encoder 20 to encode and signal an uninterrupted series of CBF values of '1' to video decoder 30.

For instance, each row, or line, of the current block may be associated with a separate CBF. Each CBF may indicate whether or not its respective associated line includes at least one non-zero transform coefficient or transform coefficient level. In many instances, several consecutive lines of a block may generate the same CBF value, by virtue of producing the same result when checked for the presence of non-zero transform coefficient(s). Video encoder 20 may implement techniques of this disclosure to encode a CBF mask based on line-to-line CBF transitions, and signal the mask to video decoder 30 for reconstruction of the block. Because the CBF is a flag, and therefore has either a value of '0' or '1' with respect to a given line, any change in CBF value can be described as a "toggling" operation.

In accordance with the CBF masking techniques of this disclosure, video encoder 20 may indicate the CBF for a currently-coded line of an SDIP-coded block by encoding and signaling a difference between the CBF value of the currently-coded line and the immediately preceding (e.g., above) line of the SDIP-coded block. For instance, if video encoder 20 determines that the CBF value for a current line is different from the CBF value for the line positioned immediately above the current line, then video encoder 20 may encode a CBF mask having a value of 1. In other words, according to the CBF masking techniques of this disclosure, a CBF mask value of 1 indicates a transition of the CBF value from the immediately previously-coded SDIP sub-block (in this example, a line).

The CBF masking techniques are described below with respect to one particular non-limiting example. In this example, video encoder 20 may determine that the CBF value for the topmost line of the block has a value of 1, the CBF value for the second-from-the-top line is 0, the CBF value for the third-from-the-top line is 1, and the CBF value for the fourth-from-the-top line is 0. Thus, in this example, video encoder 20 may identify the following series of CBF values with respect to the top four lines of the SDIP-coded block: 1010. In accordance with the CBF masking techniques of this disclosure, video encoder 20 may encode and signal transition-indicating values with respect to the CBF values of the second-from-the-top line and beyond.

For instance, because the topmost line of the SDIP-coded block does not have an immediately preceding line from which to perform CBF prediction, video encoder 20 may directly encode the CBF value for the topmost line as the CBF mask. In the example discussed above, video encoder 20 may encode the CBF value of 1 as the CBF mask for the topmost line of the block. In turn, video encoder 20 may code the CBF mask for the second line as a transition indicator with respect to the CBF of the first line, the CBF mask for the third line as a transition indicator with respect to the CBF of the second line, and so on. In this example, because the second-from-the-top line of the block has a CBF with a zero (0) value, video encoder 20 may detect a transition from the CBF value of the topmost line to the CBF value of the second line. Thus, video encoder 20 may encode a CBF mask of '1' with respect to the second line.

In turn, video encoder 20 may determine that the CBF value of '0' for the third-from-the-top line indicates a transition from the CBF value for the second line, and may encode a CBF mask of '1' for the third line, based on the detected transition. Additionally, video encoder 20 may determine that the CBF value of '1' for the fourth-from-the-top line indicates a transition from the CBF value for the third line, and may encode a CBF mask of '1' for the fourth line, based on the detected transition. Thus, in the example described above, video encoder 20 may encode a series of CBF mask values of '1111' for the first four lines of the SDIP-coded block.

Compared to the direct encoding of the raw CBF value series of '1010,' the CBF mask series of '1111' may enable more efficient encoding by video encoder 20 and more efficient decoding by video decoder 30. The scenario described above represents an example in which the CBF masking techniques of this disclosure enable video encoder 20 and video decoder 30 to improve coding efficiencies in situations where the CBFs for a series of lines alternate in value. It will be appreciated that the CBF masking techniques of this disclosure may also enable video encoder 20 and video decoder 30 to improve coding efficiency and conserve bandwidth in scenarios where lines of an SDIP-coded block result in a run of consecutive identical CBF values. For instance, if each of the first ten lines of the block includes at least one non-zero transform coefficient, then the first ten lines all produce a CBF value of 1.

In this example, the series of CBF values at the beginning of the block is '1111111111.' Using the CBF masking techniques of this disclosure, video encoder 20 may encode the CBF value of '1' for the first line, and then code a nine-bit series of '000000000' to indicate the lack of a transition over the next nine lines. In performing the reciprocal aspects of the CBF masking techniques, video decoder 30 may decode the first value of '1' to obtain the raw CBF value for the first line. In turn, video decoder 30 may use the successive mask values of '0' to reconstruct nine consecutive CBF values of '1' based on the lack of a value transition from the first CBF through the tenth CBF. In this way, the CBF masking techniques of this disclosure enable video encoder 20 and video decoder 30 to use each line of an SDIP-coded block as a binary vector, and thereby infer the CBF value for each line with enhanced efficiency when compared to existing SDIP-based coding technology.

Moreover, video encoder 20 and video decoder 30 may derive contexts for CABAC or entropy coding of the CBF values of an SDIP-coded block. In the example described above in which the first four CBF values are '1010,' video encoder 20 may adapt the CABAC context for a particular line based on the CABAC context for the line that immediately precedes it. For instance, video encoder 20 may predict the most probable CABAC context for the CBF flag for a line, based on the CABAC context used for the CBF flag for the preceding line. By predicting the CABAC context for a CBF for a current line from the CABAC context used for coding the CBF of the preceding line, video encoder 20 may conserve the bitrate consumed by context signaling. In some instances, video encoder 20 may reduce the number of bits required for context signaling from 2.3 bits to 0.3 bits, by predicting the most probable context. In this way, the CBF masking techniques of this disclosure may enable video encoder 20 to implement a significant bitrate reduction with respect to signaling, and may enable video encoder 20 and video decoder 30 to conserve computing resources and complexity with respect to deriving the CABAC contexts.

According to the techniques described herein, video encoder 20 may predict the CBF of a particular subblock from one or more previously-coded subblocks. As one example, video encoder 20 may predict the CBF of the current subblock from the CBF value for the latest coded subblock. According to some example implementations, video encoder 20 may signal the difference between the CBF of the current subblock and the predicted CBF which is generated from one or more previously-coded subblocks (or, for example, just the latest coded subblock). By signaling the difference between the CBF of the current subblock and the predicted CBF, video encoder 20 may conserve computing resources and bandwidth while enabling video decoder 30 to accurately derive the CBF value of the current subblock. In another example implementation, video encoder 20 and/or video decoder 30 may design different contexts for entropy coding based on the previously coded subblocks.

It will be appreciated that, while various examples described herein use lines (e.g., with a 'line' representing a single pixel row or a single pixel column) to correspond to subblocks, the techniques of this disclosure are applicable to different subblock shapes and configurations as well. For instance, subblocks may form an incomplete portion of a line, may form a line, or may span portions of multiple lines, as the case may be.

Additionally, video encoder 20 and video decoder 30 may implement the techniques of this disclosure to select a context for CABAC or entropy coding the position of the last significant coefficient (last_pos) for a subblock. The last_pos information may indicate horizontal and vertical (x- and y-) coordinates of the last significant coefficient within the TU. Video decoder 30 may use the position of the last significant coefficient to determine when data of the bitstream represents subsequent syntax elements, that is, syntax elements that do not represent data of the block being regenerated. Besides the CBF of a subblock, the position of the last significant coefficient of a subblock also depends on last_pos of previously-coded subblocks. According to the techniques described herein, video encoder 20 and/or video decoder 30 may calculate the context design for the entropy coding of the last significant coefficient position based on the amplitude of the last_pos information for one or more previously-coded (e.g., previously-encoded or previously-decoded) subblocks.

In one example use case, video encoder 20 and/or video decoder 30 may select between "context set 1" and "context set 2" for entropy coding the last significant coefficient. In this example, if the last_pos value for a previously-coded subblock (e.g., the immediately previously-coded subblock) is greater than zero (0), then video encoder 20 and/or video decoder 30 may use context 1 for CABAC or entropy coding the last significant coefficient of the current subblock. Otherwise (e.g., if the last_pos of the previously coded subblock is equal to or less than zero (0)), then video encoder 20 and/or video decoder 30 may use context set 2 for entropy coding the last significant coefficient of the current subblock. In this way, techniques of this disclosure enable video encoder 20 and video decoder 30 to leverage last_pos information from previously-coded subblocks to derive a context with which to code the last_pos information for a current subblock.

In some aspects, this disclosure is directed to transform precision manipulation by using a difference/delta of a quantization parameter (referred to herein as a "delta-QP"). Although described herein with respect to SDIP-coded blocks, it will be appreciated that the transform precision manipulation techniques of this disclosure are applicable to other types of coding (e.g., intra coding and/or inter-prediction) as well.

In some use case scenarios, the use of rectangular blocks may cause one or more potential issues with respect to computational and/or calculation considerations that do not arise when using square blocks. The QP size for a TU is calculated as $\sqrt{(w*h)}$, where represents a square root function, 'w' represents the width of the TU, and 'h' represents the height of the TU. In the case of square blocks, the QP size, when calculated as described above, is always an integer value. More specifically, because the w and h values are equal for a square block, the square root of the product of (w*h) is always a value that is equal to w and equal to h. More specifically, for commonly-used square block sizes, such as 64 by 64, the QP size tends to be an integer multiple of 2. As such, the distribution of quantization over a square block may involve a power of 2, due to matrix calculation and other factors.

However, for most rectangular block form factors that are commonly used in video coding, the result of the $\sqrt{(w*h)}$ operation is a multiple of the square root of 2, which is equal to approximately 1.414, and denoted herein as $\sqrt{2}$. For instance, one of the commonly used rectangular block sizes is 4×8. In the case of a 4×8 block, the QP size calculation calls for a $\sqrt{(4*8)}$ operation, which results in a value of $\sqrt{32}$. $\sqrt{32}$ is a multiple of $\sqrt{2}$, and in particular, is equal to $4*\sqrt{2}$. Similarly, a rectangular block of 8×16 dimensionality produces a QP size of $8*\sqrt{2}$, a rectangular block of 16×32 dimensionality produces a QP size of $16*\sqrt{2}$, and so on.

As such, the non-integer result of QP size calculations for rectangular blocks is referred to herein as a "$\sqrt{2}$ problem." The $\sqrt{2}$ problem yields floating point values for QP size, and any rounding operations to eliminate the floating point nature of these values results in a loss of coding precision. With increases in transform size, coding precision issues arising from the floating point results of the $\sqrt{2}$ problem are becoming more severe. HEVC sets forth uniform reconstruction quantization, using a scaling parameter QP that may fall in a range from zero (0) to fifty one (51). According to the HEVC quantization techniques, an increase of one (1) in the QP value may result in an increase of approximately twelve percent (12%) for a corresponding quantization step size ("Qstep"). For instance, the 12% increase in the Qstep may represent a raw Qstep value increase of two and one-sixth (2⅙). Based on the incremental Qstep increases caused by corresponding increases in QP value, the Qstep doubles for every increase of six (6) in QP. In cases where the Qstep is equal to one (1) for a QP of four (4), the relationship between the QP value and the corresponding Qstep for an orthonormal transform is given by the following equation:

$$Qstep(QP)=2^{(QP-4)/6}$$

To address the √2 problem associated with quantization of many commonly-used rectangular TU sizes, video encoder 20 and/or video decoder 30 may implement one or more of the transform precision manipulation techniques of this disclosure.

If a transform unit (TU) size is denoted by the expression $2^n \times 2^m$ or $2^n$-by-$2^m$ (where '$2^n$' represents a number of rows and '$2^m$' represents the number of columns), then the forward transform is represented by the following formula:

$$Y = T2^n \cdot X2^n \times 2^m \cdot T2^m$$

According to the notation used in the formula above, $X2^n \times 2^m$ would denote a residual block with 'n' number of rows and 'm' number of columns. Thus, the term X2n×2m used in the formula above denotes a residual block with a number of rows equaling '$2^n$' and a number of columns equaling '$2^m$'. $T_v$ and $T_h$ are the corresponding $2^n \times 2^n$ ($2^n$-by-$2^n$) and $2^m \times 2^m$ ($2^m$-by-$2^m$) matrices for column and row transforms, and Y denotes the coefficient matrix. In some examples, one of n or m is equal to 0.

According to one or more of the transform precision manipulation techniques described herein, when the operation (n+m) results in an odd number, video encoder 20 and/or video decoder 30 may add a delta QP value to the derived QP value associated with the current transform unit for quantization or dequantization of the corresponding TU data. By adding the delta QP to the derived QP value, video encoder 20 and video decoder 30 may use the original scaling factor that was defined for a square transform. For instance, the square transform for which the original scaling factor was defined may be expressed as having a K-by-K dimensionality. The value of 'K,' which represents the magnitude of one side of the square transform, may be defined as ((n+m)>>1) in some examples, or as ((n+m+1) >>1) in other examples. The operator '>>' denotes an arithmetic right-shift operation and, as described above, 'n' represents the number of rows of the residual block and 'm' represents the number of columns of the residual block.

As an example, for a 4×8 transform, video encoder 20 and video decoder 30 may inherit the scaling factor defined for a 4×4 transform or an 8×8 transform. In this example, before implementing quantization or dequantization according to the scaling factor for a smaller transform size (e.g., 4×4 in the example described above), video encoder 20 and video decoder 30 may reduce the energy of the transform coefficients by (1/√2), which represents approximately a 30% reduction. In turn, to compensate for the reduced energy, video encoder 20 and video decoder 30 may reduce the corresponding Qstep by √2.

As described above, a QP increase of 1 may result in an approximately 12% increase in the corresponding Qstep. Thus, a QP decrease of 1 may result in an approximately 12% drop or decrease in the corresponding Qstep. Additionally, for transform coefficients for which the energy has been reduced by roughly 30%, video encoder 20 and video decoder 30 may compensate for the energy reduction by decreasing the corresponding QP by 3. The QP reduction of 3 is derived according to the formula ceiling (30%/12%), where the ceiling( ) operation returns a maximum possible value for the operand. Thus, in this example, the delta QP value is always set to −3 (negative three or minus three).

Alternatively, video encoder 20 and video decoder 30 may adaptively change the delta QP value, based on the derived QP value associated with the current transform unit.

Figure 2:
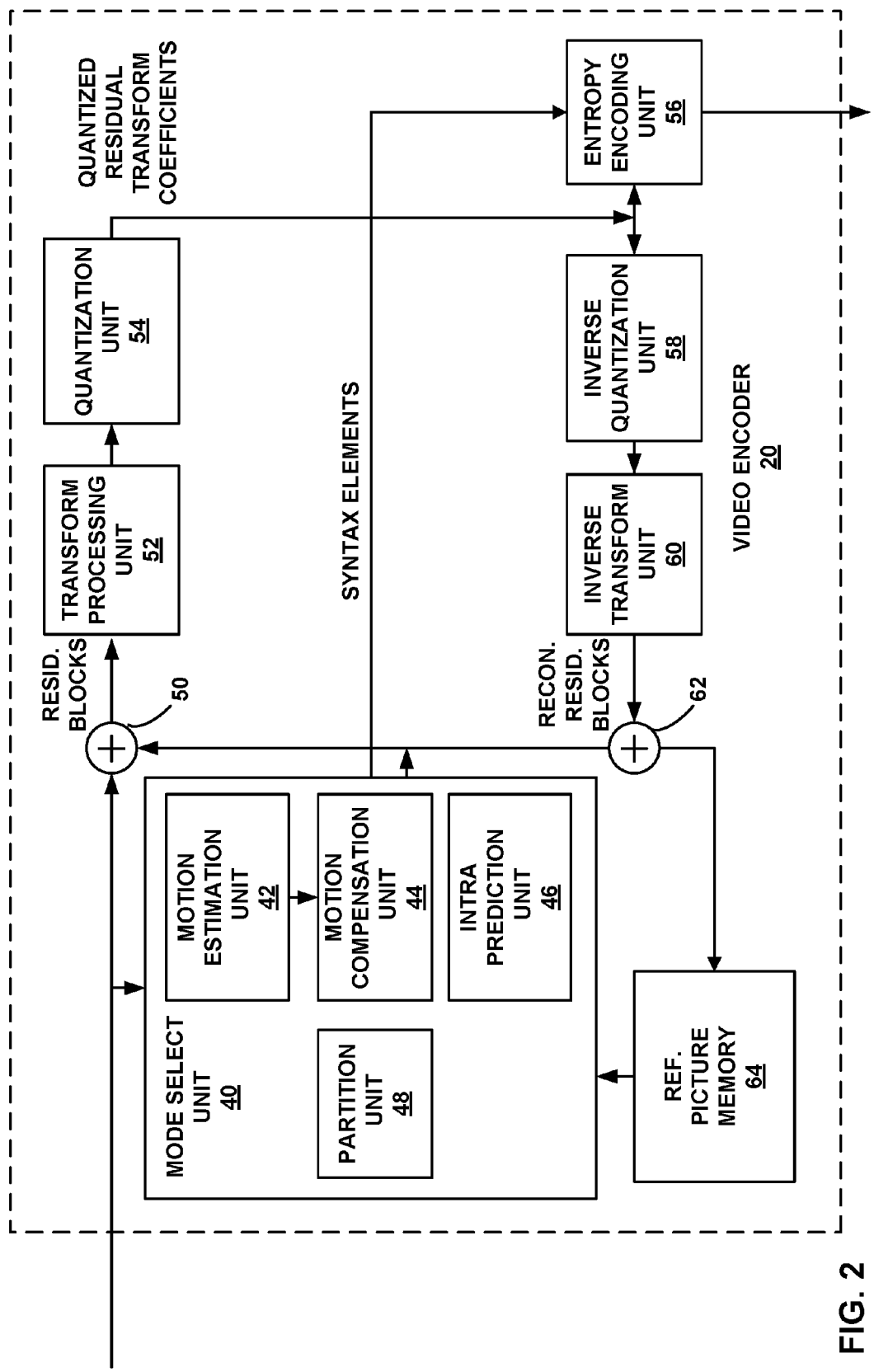
FIG. 2 is a block diagram illustrating an example video encoder that may implement the techniques of this disclosure.

FIG. 2 is a block diagram illustrating an example of a video encoder 20 that may use techniques for intra-prediction coding as described in this disclosure. The video encoder 20 will be described in the context of HEVC coding for purposes of illustration, but without limitation of this disclosure as to other coding standards or methods that may require scanning of transform coefficients Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal compression. Intra-prediction unit 46 may alternatively perform intra-predictive coding of the received video block relative to one or more neighboring blocks in the same frame or slice as the block to be coded to provide spatial compression. Video encoder 20 may perform multiple coding passes, e.g., to select an appropriate coding mode for each block of video data.

Moreover, partition unit 48 may partition blocks of video data into subblocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

According to aspects of this disclosure, in some instances, intra-prediction unit 46 may select an SDIP mode when predicting a block of video data. For example, as noted above, intra-prediction unit 46 may perform a rate-distortion analysis to determine an intra-prediction mode having the best-rate distortion characteristics. In addition, intra-prediction unit 46 may perform a rate-distortion analysis to determine a partitioning of a CU into one or more PUs for intra-prediction. That is, assuming that the size of a particular CU is 2N×2N, intra-prediction unit 46 may determine whether to predict the CU as a whole using a 2N×2N PU, predict the CU using four equally sized N×N PUs, or whether to predict the CU using a number of parallel PUs (e.g., using SDIP modes 2N×hN or nN×2N). While described with respect to intra-prediction unit 46, the partitioning of a CU may (or alternatively) be determined by partition unit 48.

In any case, according to aspects of this disclosure, intra-prediction unit 46 may use one or more partition mode tables to indicate a particular partitioning mode, regardless of the partitioning mode. For example, intra-prediction unit 46 may indicate a prediction partitioning mode for partitioning a CU into one or more PUs using a partition mode table, including for SDIP modes.

In some instances, intra-prediction unit 46 may be restricted from using certain intra-prediction modes during coding. For example, intra-prediction unit 46 may be restricted from using one or more intra-prediction modes unless predetermined criteria have been met. In an example for purposes of illustration, intra-prediction unit 46 may not use SDIP modes unless a CU is larger than a predetermined size (e.g., 64×64, 32×32, and the like). In some such examples, the partition mode table may include separate mappings based on the criteria. That is, for example, a particular partition mode may map to a first bin string for a CUs that are equal to or larger than 64×64 and a second, different bin string for CUs that are smaller than 64×64.

In some instances, intra-mode prediction unit 46 may maintain more than one partition mode table. For example, intra-prediction unit 46 may maintain a single partition mode table for all slices (e.g., I-slices, P-slices, and B-slices). In another example, however, intra-prediction unit 46 may maintain separate partition mode tables for different slice types. That is, intra-prediction unit 46 may maintain a separate table for I-slices than is used for P-slices and/or B-slices.

In instances in which intra-prediction unit 46 maintains more than one partition mode table, intra-prediction unit 46 may select a partition mode table based on a variety of factors. For example, in instances in which intra-prediction unit 46 maintains separate tables for different slice types (e.g., I/P/B slices), intra-prediction unit 46 may select a partition mode table based on the slice type of the block being coded. In other examples, intra-prediction unit 46 may select a partition mode table based on picture size, frame rate, quantization parameter (QP), CU depth, and the like. Such information is generally known to both video encoder 20 and video decoder 30. Accordingly, selection criteria need not be included in the bitstream. However, in other examples, data for selection of a partition mode table may be signaled in the bitstream using one or more syntax elements, such one or more high level syntax elements included in a parameter set.

Intra-prediction unit 46 may implement various techniques of this disclosure to adapt the processing order of subblocks of an SDIP-encoded block, based on detecting one or more conditions. As discussed above, according to SDIP, the processing order of the subblocks is from top-to-bottom and left-to-right. SDIP provides a potential advantage over other intra prediction modes in that the reconstructed neighboring pixels tend to be significantly closer to the predicted pixels. Because of the comparatively closer proximity of the reconstructed neighboring pixels to the current pixel, SDIP technology tends to enhance the accuracy of the prediction of the current pixel.

However, because the prediction order of existing SDIP technology is always top-down and left-to-right, intra-prediction unit 46 may not always be able to fully leverage the encoded pixels in the previously coded subblock when encoding a current pixel. For example, if the intra-prediction direction is from the bottom-left, the current pixel is always intra-predicted from one or more pixels located below and to the left of the current pixel (that is, from one or more "bottom-left" pixels with respect to the current pixel). Similarly, if the intra-prediction direction is from the top-right, the current pixel is always intra-predicted from one or more pixels located above and to the right of the current pixel (that is, from one or more "top-right" pixels with respect to the current pixel).

However, the top-down and left-to-right processing orders may not improve the prediction accuracy of the current pixel in certain scenarios, and may potentially diminish or hinder the prediction accuracy. For instance, according to the top-down nature of SDIP processing order, the bottom-left neighboring pixels may not yet be reconstructed when intra-prediction unit 46 is ready to begin predicting the current pixel. Similarly, according to the left-to-right nature of the SDIP processing order, the top-right neighboring pixels may not yet be reconstructed when intra-prediction unit 46 is ready to begin predicting the current pixel. Thus, intra-prediction unit 46 may not have access to the intra-prediction reference pixels at the time when intra-prediction unit 46 is ready to predict the current pixel according to SDIP processing order in certain scenarios.

Intra-prediction unit 46 may implement the techniques of this disclosure to change the processing orders for the bottom-left intra prediction and top-right intra prediction to bottom-up and right-to-left, respectively, based on detecting that particular intra-prediction directions apply with respect to the encoding of a current pixel. Said another way, intra-prediction unit 46 may change the processing order based on the intra-prediction angle for the current CU. For instance, intra-prediction unit 46 may implement the techniques of this disclosure to change the processing order under certain conditions to address scenarios in which encoded reference pixels are not available in for intra-predicting a current pixel in accordance with the existing SDIP processing orders.

According to the techniques described herein, intra-prediction unit 46 may implement a bottom-up processing order with respect to an SDIP-encoded subblock in cases of the intra-prediction angle being bottom-left. It will be appreciated that, in cases where intra-prediction unit 46 changes the processing order to be bottom-up, intra-prediction unit 46 may maintain the left-to-right aspect of existing SDIP-based coding technology. By changing the processing order of an SDIP-coded block to bottom-up (with the left-to-right aspects retained) in cases of the corresponding intra-prediction angle being bottom-left, intra-prediction unit 46 may implement the techniques of this disclosure to enhance the accuracy of prediction of a current block. For example, if the top-down processing order of existing SDIP technology is combined with a bottom-left intra prediction angle, then intra-prediction unit 46 may not have access to encoded pixels from bottom-left blocks or rows, which intra-prediction unit 46 may need for intra-predicting the current pixel. In this scenario, the pixels from the bottom-left blocks or rows may not have been encoded yet, due to the processing order provided by existing SDIP technology. As a result, to perform SDIP according to the existing technologies, intra-prediction unit 46 may need to use pixels that have been encoded in another block, such as a neighboring block.

However, by switching the processing order of an SDIP-coded block to bottom-up in cases of the intra-prediction direction being bottom-left, intra-prediction unit 46 may continue to leverage reference pixels that are located in close proximity to the current pixel for implementing SDIP-based encoding of the current subblock. By using the bottom-up processing order with respect to the SDIP-coded subblock, intra-prediction unit 46 may implement SDIP-based intra-prediction in such a manner that encoded bottom-left neighboring pixels are available as reference pixels for intra-predicting a current pixel. For instance, because intra-prediction unit 46 processes the pixels of the SDIP-coded subblock in a bottom-up order, the below-neighboring pixels, and their below-neighboring pixels, are, by definition, already encoded before intra-prediction unit 46 begins processing the current pixel. As such, intra-prediction unit 46 may, in cases of the intra-prediction angle being bottom-left, adapt the SDIP processing order to be bottom-up and left-to-right, to enhance prediction accuracy in accordance with various aspects of this disclosure.

Additionally, according to the techniques described herein, intra-prediction unit 46 may implement a right-to-left processing order with respect to an SDIP-encoded subblock in cases of the intra-prediction angle being top-right. It will be appreciated that, in cases where intra-prediction unit 46 changes the processing order to be right-to-left, intra-prediction unit 46 may maintain the top-down aspect of existing SDIP-based coding technology. By changing the processing order of an SDIP-coded block to right-to-left (with the top-down aspects retained) in cases of the corresponding intra-prediction angle being top-right, intra-prediction unit 46 may implement the techniques of this disclosure to enhance the accuracy of prediction of a current block. For example, if the left-to-right processing order of existing SDIP technology is combined with a top-right intra prediction angle, then intra-prediction unit 46 may not have access to encoded pixels from top-right blocks or rows, which intra-prediction unit 46 may need for intra-predicting the current pixel. In this scenario, the pixels from the top-right (alternatively, "above-right") blocks or rows may not have been encoded yet, due to the processing order provided by existing SDIP technology. As a result, to perform SDIP according to the existing technologies, intra-prediction unit 46 may need to use pixels that have been encoded in another block, such as a neighboring block.

However, by switching the processing order of an SDIP-coded block to be right-to-left in cases of the intra-prediction direction being top-right, intra-prediction unit 46 may continue to leverage reference pixels that are located in close proximity to the current pixel for implementing SDIP-based encoding of the current subblock. By using the right-to-left processing order with respect to the SDIP-coded subblock, intra-prediction unit 46 may implement SDIP-based intra-prediction in such a manner that encoded top-right neighboring pixels are available as reference pixels for intra-predicting a current pixel. For instance, because intra-prediction unit 46 processes the pixels of the SDIP-coded subblock in a right-to-left order, the right-neighboring pixels, and their right-neighboring pixels, are, by definition, already encoded before intra-prediction unit 46 begins processing the current pixel. As such, intra-prediction unit 46 may, in cases of the intra-prediction angle being top-right, adapt the SDIP processing order to be right-to-left and top-down, to enhance prediction accuracy in accordance with various aspects of this disclosure.

Because intra-prediction unit 46 may implement the techniques described above to alter the processing order only in cases of the intra prediction angle being bottom-left or top-right, intra-prediction unit 46 may maintain the advantages provided by SDIP with respect to the remaining intra prediction directions, while leveraging the changed processing orders to improve accuracy of SDIP based coding in cases where the intra prediction direction is either bottom-left or top-right. Said another way, intra-prediction unit 46 may implement the SDIP processing order adaptation of this disclosure only in scenarios where the adaptation would potentially improve the coding accuracy provided by SDIP-based coding, while adhering to existing SDIP processing orders in scenarios where an adaptation may not yield potential accuracy enhancements. In this manner, intra-prediction unit 46 may implement the techniques described herein to enhance prediction accuracy of SDIP-based coding in certain scenarios, without negatively impacting the advantages of SDIP in the remaining scenarios.

In cases of SDIP-based coding as well as in other coding modes, intra-prediction unit 46 may implement various techniques of this disclosure to encode a CBF mask based on subblock-to-subblock transitions in CBF value. Purely to aid in the ease of discussion, the CBF masking techniques are discussed herein with respect to SDIP-coded blocks, although it will be appreciated that intra-prediction unit 46 may also implement the CBF masking techniques of this disclosure with respect to blocks coded using non-SDIP-related technologies, as well.

Because a CBF is a flag, a given CBF has either a value of '0' or '1' with respect to a given subblock. As such, any transition in CBF value represents a toggling operation. In accordance with the CBF masking techniques of this disclosure, intra-prediction unit 46 may provide an indication of the CBF value for a currently-coded subblock by encoding a difference between the CBF value of the currently-coded subblock and the immediately preceding subblock of the SDIP-coded block. For instance, if intra-prediction unit 46 determines that the CBF value for a current subblock is different from the CBF value for the subblock positioned immediately before (e.g., above in a top-down processing order or below in a bottom-up processing order) the current subblock, then intra-prediction unit 46 may encode a CBF mask having a value of 1. In other words, according to the CBF masking techniques of this disclosure, a CBF mask value of 1 indicates a transition of the CBF value from the immediately previously-encoded SDIP subblock.

For instance, if each of the ten first encoded subblocks of the SDIP-coded block includes at least one non-zero transform coefficient, then intra-prediction unit 46 may determine that each of the first ten encoded subblocks produces a CBF value of 1. In this example, the series of CBF values at the beginning (e.g., at the top in a top-down processing order, or at the bottom in a bottom-up processing order) of the SDIP-coded block is '1111111111.' Using the CBF masking techniques of this disclosure, intra-prediction unit 46 may encode the raw CBF value of '1' for the first subblock, and then encode a nine-bit series of "000000000" to indicate the lack of a transition over the next nine subblocks. In this way, intra-prediction unit 46 may implement the CBF masking techniques of this disclosure to use each discrete subblock of an SDIP-coded block as a binary vector, and to thereby imply the CBF value for each line using a CBF mask. By implementing the CBF masking techniques of this disclosure, intra-prediction unit 46 may reduce resource consumption and encoding complexity, while maintaining CBF accuracy, in comparison to existing CBF coding technology.

In some examples, intra-prediction unit 46 may derive contexts for CABAC or entropy coding of the CBF values of an SDIP-coded block. In the example described above in which the first ten CBF values are '1111111111,' intra-prediction unit 46 may adapt the CABAC context for a particular subblock based on the CABAC context for the subblock that was encoded immediately before. For instance, intra-prediction unit 46 may predict the most probable CABAC context for the CBF flag for a subblock, based on the CABAC context used for the CBF flag for the preceding subblock (e.g., a left-neighboring subblock in left-to-right processing order, or a right-neighboring subblock in right-to-left processing order).

By predicting the CABAC context for a CBF for a current subblock from the CABAC context used for coding the CBF of the immediately previously-encoded subblock, intra-prediction unit 46 may conserve the bitrate consumed by context signaling. In some instances, intra-prediction unit 46 may reduce the number of bits required for context signaling from 2.3 bits to 0.3 bits, by predicting the most probable context for a subblock from the context used for CABAC coding of the preceding subblock. In this way, the CBF masking techniques of this disclosure may enable video encoder 20 to implement a significant bitrate reduction with respect to signaling, and may enable video encoder 20 to conserve computing resources and complexity with respect to deriving the CABAC contexts.

In some examples, intra-prediction unit 46 may implement the techniques of this disclosure to select a context for CABAC-based encoding or entropy encoding the position of the last significant coefficient (last_pos) for a subblock of an SDIP-coded block. Besides the CBF of a subblock, the position of the last significant coefficient of a subblock also depends on last_pos of one or more previously-encoded subblocks. According to the techniques described herein, intra-prediction unit 46 may calculate the context for CABAC-based encoding or entropy encoding of the last_pos for a subblock based on the amplitude of the last_pos information for one or more previously-encoded subblocks.

In one example use case, intra-prediction unit 46 may select between "context 1" and "context 2" for CABAC or entropy encoding of the last significant coefficient. In this example, if the last_pos value for a previously-coded subblock (e.g., the immediately previously-coded subblock) is greater than zero (0), then intra-prediction unit 46 may use context 1 for CABAC or entropy encoding the last_pos information for the current subblock. Otherwise (e.g., if the last_pos of the previously coded subblock is equal to or less than zero (0)), then intra-prediction unit 46 may use context 2 for entropy coding the last significant coefficient of the current subblock. In this way, intra-prediction unit 46 may implement one or more techniques of this disclosure to leverage last_pos information from previously-coded subblocks to derive a context with which to encode the last_pos information for a current subblock according to CABAC or entropy encoding.

In any case, transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Quantization unit 54 may implement one or more transform precision manipulation techniques of this disclosure to improve coding precision with respect various block aspect ratios, such as the aspect ratios of various rectangular TUs commonly used in video coding. For instance, quantization unit 54 may use a difference, or "delta" with respect to a quantization parameter (referred to herein as a "delta-QP"). Although described herein with respect to SDIP-coded blocks, it will be appreciated that the transform precision manipulation techniques of this disclosure are applicable to other types of coding (e.g., intra coding and/or inter-prediction) as well.

As described above, the use of rectangular blocks may cause one or more potential issues with respect to computational and/or calculation considerations that do not arise when using square blocks. The QP size for a TU is calculated as $\sqrt{(w*h)}$, where '$\sqrt{}$' represents a square root function, 'w' represents the width of the TU, and 'h' represents the height of the TU. In the case of square blocks, the QP size, when calculated as described above, is always an integer value. More specifically, because the w and h values are equal for a square block, the square root of the product of (w*h) is always a value that is equal to w and equal to h. More specifically, for commonly-used square block sizes, such as 64 by 64, the QP size tends to be an integer multiple of 2. As such, the distribution of quantization over a square block may involve a power of 2, due to matrix calculation and other factors.

However, for most rectangular block form factors that are commonly used in video coding, the result of the $\sqrt{(w*h)}$ operation is a multiple of the square root of 2, which is equal to approximately 1.414, and denoted herein as $\sqrt{2}$. For instance, one of the commonly used rectangular block sizes is 4×8. In the case of a 4×8 block, the QP size calculation calls for a $\sqrt{(4*8)}$ operation, which results in a value of $\sqrt{32}$. $\sqrt{32}$ is a multiple of $\sqrt{2}$, and in particular, is equal to $4*\sqrt{2}$. Similarly, a rectangular block of 8×16 dimensionality produces a QP size of $8*\sqrt{2}$, a rectangular block of 16×32 dimensionality produces a QP size of $16*\sqrt{2}$, and so on.

As such, the non-integer result of QP size calculations for rectangular blocks is referred to herein as a "$\sqrt{2}$ problem." The $\sqrt{2}$ problem yields floating point values for QP size, and any rounding operations to eliminate the floating point nature of these values results in a loss of coding precision. With increases in transform size, coding precision issues arising from the floating point results of the $\sqrt{2}$ problem are becoming more severe. HEVC sets forth uniform reconstruction quantization, using a scaling parameter QP that may fall in a range from zero (0) to fifty one (51). According to the HEVC quantization techniques, an increase of one (1) in the QP value may result in an increase of approximately twelve percent (12%) for a corresponding quantization step size ("Qstep"). For instance, the 12% increase in the Qstep may represent a raw Qstep value increase of two and one-sixth (2⅙). Based on the incremental Qstep increases caused by corresponding increases in QP value, the Qstep doubles for every increase of six (6) in QP. In cases where the Qstep is equal to one (1) for a QP of four (4), the relationship between the QP value and the corresponding Qstep for an orthonormal transform is given by the following equation:

$$Qstep(QP)=2^{(QP-4)/6}$$

To address the $\sqrt{2}$ problem associated with quantization of many commonly-used rectangular TU sizes, quantization unit 54 may implement one or more of the transform precision manipulation techniques of this disclosure. If a transform unit (TU) size is denoted by the expression $2^n \times 2^m$ or $2^n$-by-$2^m$ (where '$2^n$' represents a number of rows and '$2^m$' represents the number of columns), then the forward transform is represented by the following formula:

$$Y=T2^n \cdot X2^n \times 2^m \cdot T2^m$$

According to the notation used in the formula above, $X2^n \times 2^m$ would denote a residual block with 'n' number of rows and 'm' number of columns. Thus, the term X2n×2m used in the formula above denotes a residual block with a number of rows equaling '$2^n$' and a number of columns equaling '$2^m$'. $T_v$ and $T_h$ are the corresponding $2^n \times 2^n$ ($2^n$-by-$2^n$) and $2^m \times 2^m$ ($2^m$-by-$2^m$) matrices for column and row transforms, and Y denotes the coefficient matrix. In some examples, one of n or m is equal to 0.

According to one or more of the transform precision manipulation techniques described herein, in cases where the operation (n+m) results in an odd number, quantization unit 54 may add a delta QP value to the derived QP value associated with the current transform unit to quantize the corresponding TU data. By adding the delta QP to the derived QP value, quantization unit 54 may use the original scaling factor that was defined for a square transform. For instance, the square transform for which the original scaling factor was defined may be expressed as having a K-by-K dimensionality. The value of 'K,' which represents the magnitude of one side of the square transform, may be defined as ((n+m)>>1) in some examples, or as ((n+m+1)>>1) in other examples. The operator '>>' denotes an arithmetic right-shift operation and, as described above, 'n' represents the number of rows of the residual block and 'm' represents the number of columns of the residual block.

As an example, for a 4×8 transform, quantization unit 54 may inherit the scaling factor defined for a 4×4 transform or an 8×8 transform. In this example, before quantizing a TU according to the scaling factor for a smaller transform size (e.g., 4×4 in the example described above), quantization unit 54 may reduce the energy of the transform coefficients by $(1/\sqrt{2})$, which represents approximately a 30% reduction. In turn, to compensate for the reduced energy, quantization unit 54 may reduce the corresponding Qstep by $\sqrt{2}$.

As described above, a QP increase of 1 may result in an increase in the corresponding Qstep by approximately 12%. Moreover, a QP decrease of 1 may result in an approximately 12% drop or decrease in the corresponding Qstep. Additionally, for transform coefficients for which the energy has been reduced by roughly 30%, quantization unit 54 may compensate for the energy reduction by decreasing the corresponding QP by 3. The QP reduction of 3 is derived according to the formula ceiling (30%/12%), where the ceiling( ) operation returns a maximum possible value for the operand. Thus, in this example, the delta QP value is always set to −3 (negative three or minus three). Alternatively, quantization unit 54 may adaptively change the delta QP value, based on the derived QP value associated with the current transform unit.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

According to aspects of this disclosure, entropy encoding unit 56, or another unit responsible for coding (e.g., such as a fixed length coder), may encode an indication that a block of video data is coded using an SDIP mode using a partition mode table. For example, as noted above, video encoder 20 may maintain one or more partition mode tables (also referred to as codeword mapping tables) that map partition modes to syntax elements, such as binarized values representative of the partition modes. Accordingly, entropy coding unit 56 may entropy encode one or more bin strings that correspond to an entry in a partition mode table.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

Figure 3:
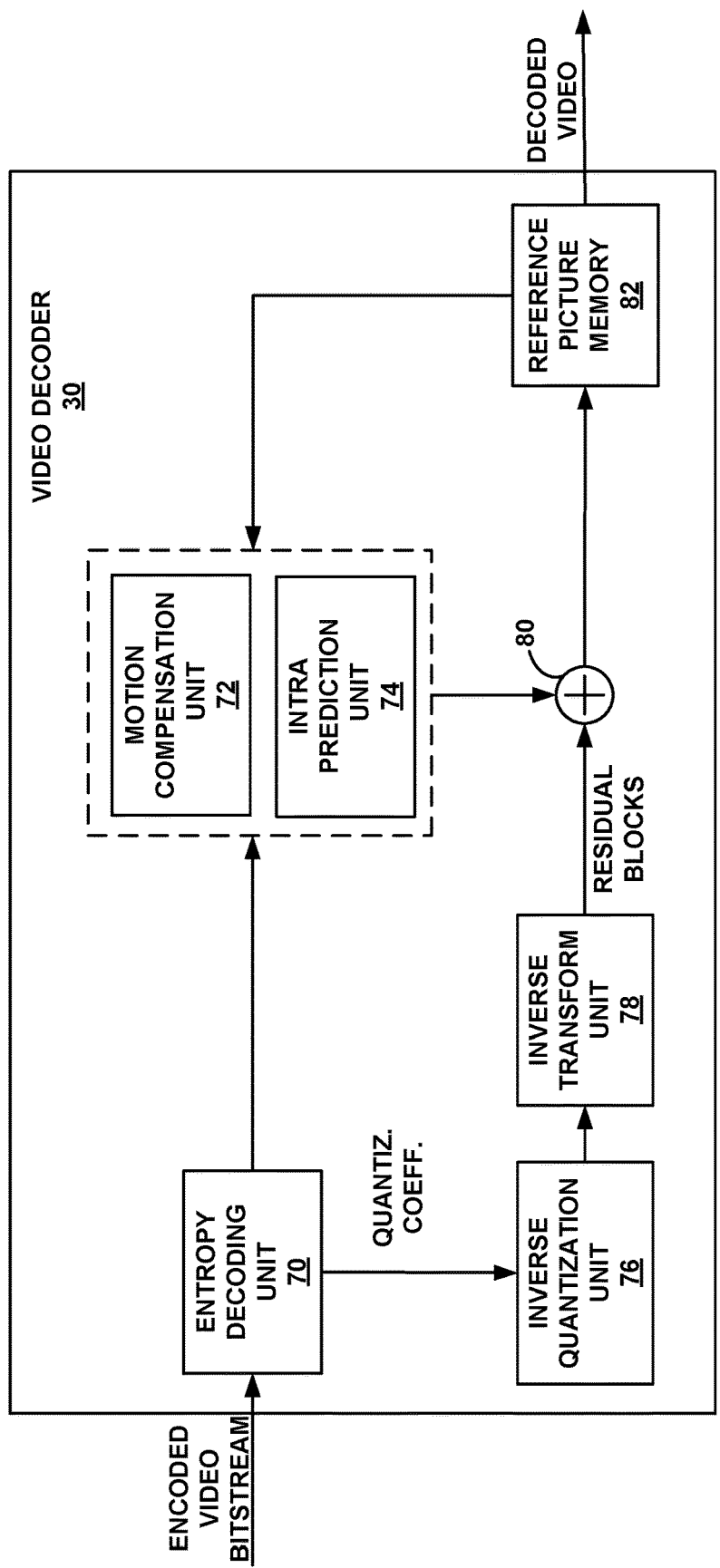
FIG. 3 is a block diagram illustrating an example video decoder that may implement the techniques of this disclosure.

FIG. 3 is a block diagram illustrating an example of video decoder 30 that may implement techniques for intra-prediction coding as described in this disclosure. In the example of FIG. 3, video decoder 30 includes an entropy decoding unit 70, motion compensation unit 72, intra prediction unit 74, inverse quantization unit 76, inverse transformation unit 78, reference picture memory 82 and summer 80.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

For example, by way of background, video decoder 30 may receive compressed video data that has been encapsulated for transmission via a network into so-called "network abstraction layer units" or NAL units. Each NAL unit may include a header that identifies a type of data stored to the NAL unit. There are two types of data that are commonly stored to NAL units. The first type of data stored to a NAL unit is video coding layer (VCL) data, which includes the compressed video data. The second type of data stored to a NAL unit is referred to as non-VCL data, which includes additional information such as parameter sets that define header data common to a large number of NAL units and supplemental enhancement information (SEI). For example, parameter sets may contain the sequence-level header information (e.g., in sequence parameter sets (SPS)) and the infrequently changing picture-level header information (e.g., in picture parameter sets (PPS)). The infrequently changing information contained in the parameter sets does not need to be repeated for each sequence or picture, thereby improving coding efficiency. In addition, the use of parameter sets enables out-of-band transmission of header information, thereby avoiding the need of redundant transmissions for error resilience.

When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Intra-prediction unit 74 may intra-predict a current block, as an alternative to the inter-prediction performed by motion compensation unit 72, as described above. In particular, intra-prediction unit 74 may determine an intra-prediction mode to use to decode and reconstruct a current block. In some examples, intra-prediction unit 74 may decode a current block using various intra-prediction modes, e.g., during separate decoding passes. Intra-prediction unit 74 may select appropriate intra-prediction mode(s) based on respective indications of intra-prediction modes used by video encoder 20 and/or components thereof For example, intra-prediction unit 74 may select the intra-prediction mode for a block based on an indication included in the encoded video bitstream received from video encoder 20. In some examples, intra-prediction unit 74 may select the SDIP mode for a block, based on an indication (e.g., a flag) signaled by video encoder 20 to indicate that the block was encoded using an SDIP coding mode of one or more available SDIP-based coding modes.

Intra-prediction unit 74 may implement various techniques of this disclosure to adapt the processing order of subblocks of an SDIP-encoded block, based on detecting one or more conditions. As discussed above, according to SDIP, the processing order of the subblocks is from top-to-bottom and left-to-right. SDIP provides a potential advantage over other intra prediction modes in that the reconstructed neighboring pixels tend to be significantly closer to the predicted pixels. Because of the comparatively closer proximity of the reconstructed neighboring pixels to the current pixel, SDIP technology tends to enhance the accuracy of the prediction of the current pixel.

However, because the processing order of existing SDIP technology is always top-down and left-to-right, intra-prediction unit 74 may not always be able to fully leverage the reconstructed pixels in the previously decoded subblock when decoding a current pixel. For example, if the intra-prediction direction is from the bottom-left, the current pixel is always intra-predicted from one or more pixels located below and to the left of the current pixel (that is, from one or more "bottom-left" pixels with respect to the current pixel). Similarly, if the intra-prediction direction is from the top-right, the current pixel is always intra-predicted from one or more pixels located above and to the right of the current pixel (that is, from one or more "top-right" pixels with respect to the current pixel).

However, the top-down and left-to-right processing orders may not improve the prediction accuracy of the current pixel in certain scenarios, and may potentially hinder or diminish the prediction accuracy. For instance, according to the top-down nature of SDIP processing order, the bottom-left neighboring pixels may not yet be reconstructed when intra-prediction unit 74 is ready to begin predicting the current pixel. Similarly, according to the left-to-right nature of the SDIP processing order, the top-right neighboring pixels may not yet be reconstructed when intra-prediction unit 74 is ready to begin predicting the current pixel. Thus, intra-prediction unit 74 may not have access to the intra-prediction reference pixels at the time when intra-prediction unit 74 is ready to predict the current pixel according to SDIP processing order in certain scenarios.

Intra-prediction unit 74 may implement the techniques of this disclosure to change the processing orders for the bottom-left intra prediction and top-right intra prediction to bottom-up and right-to-left, respectively, based on detecting that particular intra-prediction directions apply with respect to the reconstruction of a current pixel. Said another way, intra-prediction unit 74 may change the processing order based on the intra-prediction angle for the current CU. For instance, intra-prediction unit 74 may implement the techniques of this disclosure to change the processing order under certain conditions to address scenarios in which reconstructed reference pixels are not available in for intra-predicting a current pixel in accordance with the existing SDIP processing orders.

According to the techniques described herein, intra-prediction unit 74 may implement a bottom-up processing order with respect to an SDIP-encoded subblock in cases of the intra-prediction angle being bottom-left. It will be appreciated that, in cases where intra-prediction unit 74 changes the processing order to be bottom-up, intra-prediction unit 74 may maintain the left-to-right aspect of existing SDIP-based coding technology. By changing the processing order of an SDIP-coded block to bottom-up (with the left-to-right aspects retained) in cases of the corresponding intra-prediction angle being bottom-left, intra-prediction unit 74 may implement the techniques of this disclosure to enhance the accuracy of prediction of a current block.

For example, if the top-down processing order of existing SDIP technology is combined with a bottom-left intra prediction angle, then intra-prediction unit 74 may not have access to reconstructed pixels from bottom-left blocks or rows, which intra-prediction unit 74 may need for intra-predicting the current pixel. In this scenario, the pixels from the bottom-left blocks or rows may not have been reconstructed yet, due to the processing order provided by existing SDIP technology. As a result, to perform SDIP according to the existing technologies, intra-prediction unit 74 may need to use pixels that have been reconstructed in another block, such as a neighboring block.

However, by switching the processing order of an SDIP-coded block to bottom-up in cases of the intra-prediction direction being bottom-left according to the techniques of this disclosure, intra-prediction unit 74 may continue to leverage reference pixels that are located in close proximity to the current pixel for implementing SDIP-based encoding of the current subblock. By using the bottom-up processing order with respect to the SDIP-coded subblock, intra-prediction unit 74 may implement SDIP-based intra-prediction in such a manner that reconstructed bottom-left neighboring pixels are available as reference pixels for intra-predicting a current pixel. For instance, because intra-prediction unit 74 processes the pixels of the SDIP-coded subblock in a bottom-up order, the below-neighboring pixels, and their below-neighboring pixels, are, by definition, already reconstructed before intra-prediction unit 74 begins processing the current pixel. As such, intra-prediction unit 74 may, in cases of the intra-prediction angle being bottom-left, adapt the SDIP processing order to be bottom-up and left-to-right, to enhance prediction accuracy in accordance with various aspects of this disclosure.

Additionally, according to the techniques described herein, intra-prediction unit 74 may implement a right-to-left processing order with respect to reconstructing an SDIP-encoded subblock in cases of the intra-prediction angle being top-right. It will be appreciated that, in cases where intra-prediction unit 74 changes the processing order to be right-to-left, intra-prediction unit 74 may maintain the top-down aspect of existing SDIP-based coding technology. By changing the processing order of an SDIP-coded block to right-to-left (with the top-down aspects retained) in cases of the corresponding intra-prediction angle being top-right, intra-prediction unit 74 may implement the techniques of this disclosure to enhance the accuracy of prediction of a current block.

For example, if the left-to-right processing order of existing SDIP technology is combined with a top-right intra prediction angle, then intra-prediction unit 74 may not have access to reconstructed pixels from top-right blocks or rows, which intra-prediction unit 74 may need for intra-predicting the current pixel. In this scenario, the pixels from the top-right (alternatively, "above-right") blocks or rows may not have been reconstructed yet, due to the processing order provided by existing SDIP technology. As a result, to perform SDIP according to the existing technologies, intra-prediction unit 74 may need to use pixels that have been reconstructed in another block, such as in a neighboring block.

However, by switching the processing order of an SDIP-coded block to be right-to-left in cases of the intra-prediction direction being top-right, intra-prediction unit 74 may continue to leverage reference pixels that are located in close proximity to the current pixel for implementing SDIP-based decoding of the current subblock. By using the right-to-left processing order with respect to the SDIP-coded subblock, intra-prediction unit 74 may implement SDIP-based intra-prediction in such a manner that reconstructed top-right neighboring pixels are available as reference pixels for intra-predicting a current pixel. For instance, because intra-prediction unit 74 processes the pixels of the SDIP-coded subblock in a right-to-left order, the right-neighboring pixels, and their right-neighboring pixels, are, by definition, already reconstructed before intra-prediction unit 74 begins processing the current pixel. As such, intra-prediction unit 74 may, in cases of the intra-prediction angle being top-right, adapt the SDIP processing order to be right-to-left and top-down, to enhance prediction accuracy in accordance with various aspects of this disclosure.

Because intra-prediction unit 74 may implement the techniques described above to alter the processing order only in cases of the intra prediction angle being bottom-left or top-right, intra-prediction unit 74 may maintain the advantages provided by SDIP with respect to the remaining intra prediction directions, while leveraging the changed processing orders to improve accuracy of SDIP-based coding in cases where the intra prediction direction is either bottom-left or top-right. Said another way, intra-prediction unit 74 may implement the SDIP processing order adaptation of this disclosure only in scenarios where the adaptation would potentially improve the coding accuracy provided by SDIP-based coding, while adhering to existing SDIP processing orders in scenarios where an adaptation may not yield potential accuracy enhancements. In this manner, intra-prediction unit 74 may implement the techniques described herein to enhance prediction accuracy of SDIP-based coding in certain scenarios, without negatively impacting the advantages of SDIP technology in the remaining scenarios.

In cases of SDIP-based decoding as well as decoding according to other coding modes, intra-prediction unit 74 may implement various techniques of this disclosure to decode a CBF mask based on subblock-to-subblock transitions in CBF value. Purely to aid in the ease of discussion, the mask-based CBF reconstruction techniques are discussed herein with respect to SDIP-encoded blocks, although it will be appreciated that intra-prediction unit 74 may also implement the mask-based CBF reconstruction techniques of this disclosure with respect to reconstructing blocks that are encoded using non-SDIP-related technologies, as well.

Because a CBF is a flag, a given CBF has either a value of '0' or '1' with respect to a given subblock. As such, any transition in CBF value represents a toggling operation. In accordance with the mask-based CBF reconstruction techniques of this disclosure, intra-prediction unit 74 may infer or extrapolate the CBF value for a currently-decoded subblock by decoding a difference between the CBF value of the currently-decoded subblock and the immediately preceding subblock of the SDIP-coded block. For instance, if intra-prediction unit 74 decodes a signaled CBF mask value of 1 with respect to a current subblock, then intra-prediction unit 74 may determine that the CBF value for the current subblock is different from the CBF value for the subblock positioned immediately before (e.g., above in a top-down processing order or below in a bottom-up processing order) the current subblock. In other words, according to the mask-based CBF reconstruction techniques of this disclosure, a CBF mask value of 1 indicates a transition of the CBF value from the immediately previously-decoded SDIP subblock.

For instance, if intra-prediction unit 74 receives a ten-bit string of CBF masks that read '1000000000,' then intra-prediction unit 74 may determine that all the first ten subblocks of the SDIP-encoded block have CBFs with a value of '1.' For instance, intra-prediction unit 74 may determine that the first CBF mask received for the SDIP-coded block represents the raw CBF value for the subblock. In other words, intra-prediction unit 74 may determine that the first CBF mask signaled for an SDIP-encoded block is not defined with respect to a transition from another subblock, but instead, is a direct representation of the CBF value for its associated subblock. Using the mask-based CBF reconstruction techniques of this disclosure, intra-prediction unit 74 may decode the raw CBF value of '1' for the first subblock, and then infer, based on the next nine consecutive '0' values, that none of the next nine CBF values changes from its respective preceding CBF value. In this particular example, intra-prediction unit 74 determines that the second through tenth subblocks (in processing order) are all associated with CBFs having a value of '1,' because the CBF masks directly or indirectly indicate no change from the raw CBF value of 1 for the first-processed subblock.

In this way, intra-prediction unit 74 may implement the CBF masking techniques of this disclosure to use each discrete subblock of an SDIP-coded block as a binary vector, and to thereby infer or extrapolate the CBF value for each line using a CBF mask. By implementing the mask-based CBF reconstruction techniques of this disclosure, intra-prediction unit 74 may reduce resource consumption and decoding complexity, while maintaining CBF accuracy, in comparison to existing CBF reconstruction technology. Intra-prediction unit 74 may also alleviate bandwidth consumption requirements by implementing the mask-based CBF reconstruction techniques of this disclosure.

In some examples, intra-prediction unit 74 may derive contexts for CABAC-based decoding or entropy decoding of the CBF values of an SDIP-encoded block. In the example described above in which the first ten CBF values are '1111111111,' intra-prediction unit 74 may adapt the CABAC context for a particular subblock based on the CABAC context for the subblock that was reconstructed immediately prior. For instance, intra-prediction unit 74 may predict the most probable CABAC context for the CBF flag for a subblock, based on the CABAC context used for the CBF flag for the preceding subblock (e.g., a left-neighboring subblock in left-to-right processing order, or a right-neighboring subblock in right-to-left processing order).

By predicting the CABAC context for a CBF for a current subblock from the CABAC context used for coding the CBF of the immediately previously-reconstructed subblock, intra-prediction unit 74 may remove the need for a portion of the bitrate consumed by context signaling. In some instances, intra-prediction unit 74 may reduce the number of bits required for context signaling from 2.3 bits to 0.3 bits, by predicting the most probable context for a subblock from the context used for CABAC coding of the preceding subblock. In this way, the mask-based CBF reconstruction techniques of this disclosure may enable video decoder 30 to implement a significant bitrate reduction with respect to signaling requirements from video encoder 20, and may enable video decoder 30 to conserve computing resources and complexity with respect to deriving the CABAC contexts for decoding.

In some examples, intra-prediction unit 74 may implement the techniques of this disclosure to select a context for CABAC-based decoding or entropy decoding the position of the last significant coefficient (last_pos) for a subblock of an SDIP-encoded block. Besides the CBF of a subblock, the position of the last significant coefficient of a subblock also depends on last_pos of one or more previously-encoded subblocks. According to the techniques described herein, intra-prediction unit 74 may calculate the context for CABAC-based decoding or entropy decoding of the last_pos for a subblock based on the amplitude of the last_pos information for one or more previously-reconstructed subblocks.

In one example use case, intra-prediction unit 74 may select between "context 1" and "context 2" for CABAC-based decoding or entropy decoding of the last significant coefficient. In this example, if the last_pos value for a previously-reconstructed subblock (e.g., the immediately previously-reconstructed subblock) is greater than zero (0), then intra-prediction unit 74 may use context 1 for CABAC-based decoding or entropy decoding the last_pos information for the current subblock. Otherwise (e.g., if the last_pos of the previously coded subblock is equal to or less than zero (0)), then intra-prediction unit 74 may use context 2 for decoding the last significant coefficient of the current subblock. In this way, intra-prediction unit 74 may implement one or more techniques of this disclosure to leverage last_pos information from previously-reconstructed subblocks to derive a context with which to decode the last_pos information for a current subblock according to CABAC-based decoding or entropy decoding.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse quantization unit 76 may implement one or more transform precision manipulation techniques of this disclosure to improve decoding precision with respect various block aspect ratios, such as the aspect ratios of various rectangular TUs commonly used in video coding. For instance, inverse quantization unit 76 may use a difference, or "delta" with respect to a quantization parameter (referred to herein as a "delta-QP"). Although described herein with respect to SDIP-coded blocks, it will be appreciated that the transform precision manipulation techniques of this disclosure are applicable to other types of coding (e.g., intra coding and/or inter-prediction) as well.

As described above, the use of rectangular blocks may cause one or more potential issues with respect to computational and/or calculation considerations that do not arise when processing square blocks. The QP size for a TU is calculated as $\sqrt{(w*h)}$, where '$\sqrt{}$' represents a square root function, 'w' represents the width of the TU, and 'h' represents the height of the TU. In the case of square blocks, the QP size, when calculated as described above, is always an integer value. More specifically, because the 'w' and 'h' values are equal for a given square block, the square root of the product of (w*h) is always a value that is equal to w and equal to h. More specifically, for commonly-used square block sizes, such as 64 by 64, the QP size tends to be an integer multiple of 2. As such, the distribution of quantization over a square block may involve a power of 2, due to matrix calculation and other factors.

However, for most rectangular block form factors that are commonly used in video coding, the result of the $\sqrt{(w*h)}$ operation is a multiple of the square root of 2, which is equal to approximately 1.414, and denoted herein as $\sqrt{2}$. For instance, one of the commonly used rectangular block sizes is 4×8. In the case of a 4×8 block, the QP size calculation calls for a $\sqrt{(4*8)}$ operation, which results in a value of $\sqrt{32}$. $\sqrt{32}$ is a multiple of $\sqrt{2}$, and in particular, is equal to $4*\sqrt{2}$. Similarly, a rectangular block of 8×16 dimensionality produces a QP size of $8*\sqrt{2}$, a rectangular block of 16×32 dimensionality produces a QP size of $16*\sqrt{2}$, and so on.

As such, the non-integer result of QP size calculations for rectangular blocks is referred to herein as a "$\sqrt{2}$ problem." The $\sqrt{2}$ problem yields floating point values for QP size, and any rounding operations to eliminate the floating point nature of these values results in a loss of coding precision. With increases in transform size, coding precision issues arising from the floating point results of the $\sqrt{2}$ problem are becoming more severe. HEVC sets forth uniform reconstruction quantization, using a scaling parameter QP that may fall within a range from zero (0) to fifty one (51), inclusive. According to the HEVC dequantization techniques, an increase of one (1) in the QP value may result in an increase of approximately twelve percent (12%) for a corresponding quantization step size ("Qstep"). For instance, the 12% increase in the Qstep may represent a raw Qstep value increase of two and one-sixth (2⅙). Based on the incremental Qstep increases caused by corresponding increases in QP value, the Qstep doubles for every increase of six (6) in QP. In cases where the Qstep is equal to one (1) for a QP of four (4), the relationship between the QP value and the corresponding Qstep for an orthonormal transform is given by the following equation:

$$Qstep(QP) = 2^{(QP-4)/6}$$

To address the $\sqrt{2}$ problem associated with dequantization of many commonly-used rectangular TU sizes, inverse quantization unit 76 may implement one or more of the transform precision manipulation techniques of this disclosure. If a transform unit (TU) size is denoted by the expression $2^n \times 2^m$ or $2^n$-by-$2^m$ (where '$2^n$' represents a number of rows and '$2^m$' represents the number of columns), then the forward transform is represented by the following formula:

$$Y = T2^n \cdot X2^n \times 2^m \cdot T2^m$$

According to the notation used in the formula above, $X2^n \times 2^m$ would denote a residual block with 'n' number of rows and 'm' number of columns. Thus, the term X2n×2m used in the formula above denotes a residual block with a number of rows equaling '$2^n$' and a number of columns equaling '$2^m$.' $T_v$ and $T_h$ are the corresponding $2^n \times 2^n$ ($2^n$-by-$2^n$) and $2^m \times 2^m$ ($2^m$-by-$2^m$) matrices for column and row transforms, and Y denotes the coefficient matrix. In some examples, one of n or m is equal to 0.

According to one or more of the transform precision manipulation techniques described herein, in cases where the operation (n+m) results in an odd number, inverse quantization unit 76 may add a delta QP value to the derived QP value associated with the current transform unit to quantize the corresponding TU data. By adding the delta QP to the derived QP value, inverse quantization unit 76 may use the original scaling factor that was defined for a square transform. For instance, the square transform for which the original scaling factor was defined may be expressed as having a K-by-K dimensionality. The value of 'K,' which represents the magnitude of one side of the square transform, may be defined as $((n+m)\gg1)$ in some examples, or as $((n+m+1)\gg1)$ in other examples. The operator '>>' denotes an arithmetic right-shift operation and, as described above, 'n' represents the number of rows of the residual block and 'm' represents the number of columns of the residual block.

As an example, for a 4×8 transform, inverse quantization unit 76 may inherit the scaling factor defined for a 4×4 transform or an 8×8 transform. In this example, before quantizing a TU according to the scaling factor for a smaller transform size (e.g., 4×4 in the example described above), inverse quantization unit 76 may reduce the energy of the transform coefficients by $(1/\sqrt{2})$, which represents approximately a 30% reduction. In turn, to compensate for the reduced energy, inverse quantization unit 76 may reduce the corresponding Qstep by $\sqrt{2}$.

As described above, a QP increase of 1 may result in an increase in the corresponding Qstep by approximately 12%. Moreover, a QP decrease of 1 may result in an approximately 12% drop or decrease in the corresponding Qstep. Additionally, for transform coefficients for which the energy has been reduced by roughly 30%, inverse quantization unit 76 may compensate for the energy reduction by decreasing the corresponding QP by 3. The QP reduction of 3 is derived according to the formula ceiling (30%/12%), where the ceiling( ) operation returns a maximum possible value for the operand. Thus, in this example, the delta QP value is always set to −3 (negative three or minus three). Alternatively, inverse quantization unit 76 may adaptively change the delta QP value, based on the derived QP value associated with the current transform unit.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

Figure 4A:
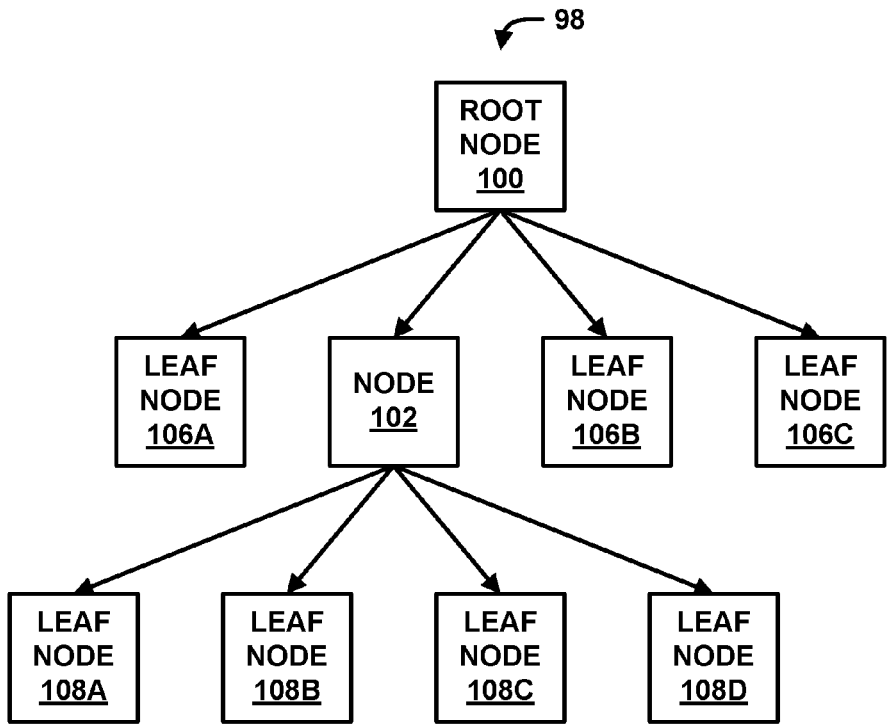
FIGS. 4A and 4B are conceptual diagrams illustrating an example quadtree and a corresponding largest coding unit (LCU).
Figure 4B:
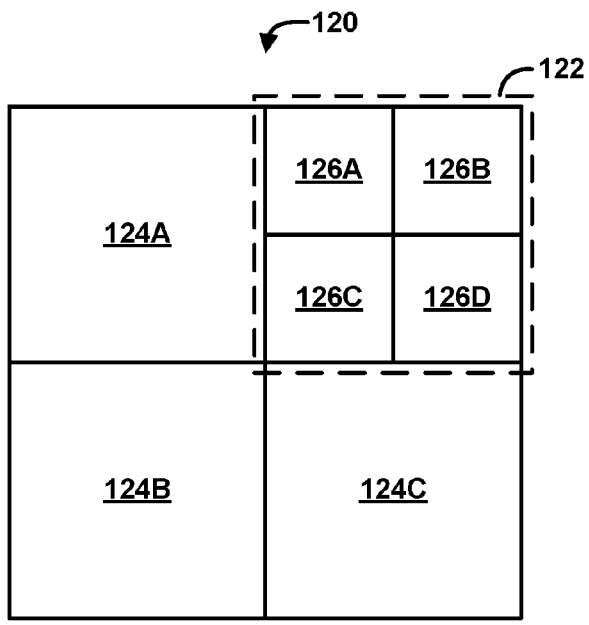

FIGS. 4A and 4B are conceptual diagrams illustrating an example quadtree 98 and a corresponding largest coding unit 120. FIG. 4A depicts an example quadtree 98, which includes nodes arranged in a hierarchical fashion. The quadtree 98 may be associated with, for example, a treeblock according to the proposed HEVC standard. Each node in a quadtree, such as quadtree 98, may be a leaf node with no children, or have four child nodes. In the example of FIG. 4A, quadtree 98 includes root node 100. Root node 100 has four child nodes, including leaf nodes 106A-106C (leaf nodes 106) and node 102. Because node 102 is not a leaf node, node 102 includes four child nodes, which in this example, are leaf nodes 108A-108D (leaf nodes 108).

Quadtree 98 may include data describing characteristics of a corresponding largest coding unit (LCU), such as LCU 120 in this example. For example, quadtree 98, by its structure, may describe splitting of the LCU into sub-CUs. Assume that LCU 120 has a size of 2N×2N. LCU 120, in this example, has four sub-CUs 124A-124C (sub-CUs 124) and 122, each of size N×N. Sub-CU 122 is further split into four sub-CUs 126A-126D (sub-CUs 126), each of size N/2×N/2. The structure of quadtree 98 corresponds to the splitting of LCU 120, in this example. That is, root node 100 corresponds to LCU 120, leaf nodes 106 correspond to sub-CUs 124, node 102 corresponds to sub-CU 122, and leaf nodes 108 correspond to sub-CUs 126.

Data for nodes of quadtree 98 may describe whether the CU corresponding to the node is split. If the CU is split, four additional nodes may be present in quadtree 98. In some examples, a node of a quadtree may be implemented similar to the following pseudocode:

```
quadtree_node {
    boolean split_flag(1);
    // signaling data
    if (split_flag) {
        quadtree_node child1;
        quadtree_node child2;
        quadtree_node child3;
        quadtree_node child4;
    }
}
```

The split_flag value may be a one-bit value representative of whether the CU corresponding to the current node is split. If the CU is not split, the split_flag value may be '0', while if the CU is split, the split_flag value may be '1'. With respect to the example of quadtree 98, an array of split flag values may be 101000000.

As noted above, CU depth may refer to the extent to which an LCU, such as LCU 120 has been divided. For example, root node 100 may correspond to CU depth zero, while node 102 and leaf nodes 106 may correspond to CU depth one. In addition, leaf nodes 108 may correspond to CU depth two. According to aspects of this disclosure, CU and/or TU depth may be used as context for entropy coding certain syntax elements. In an example for purposes of explanation, one or more syntax elements associated with leaf node 106A may be entropy coded using a different context model than leaf node 108A, because leaf node 106A is located at depth one, while leaf node 108A is located at depth two.

While FIG. 4A illustrates an example of a CU quadtree, it should be understood that a similar quadtree may be applied to TUs of a leaf-node CU. That is, a leaf-node CU may include a TU quadtree (referred to as a residual quadtree (RQT)) that describes partitioning of TUs for the CU. A TU quadtree may generally resemble a CU quadtree, except that the TU quadtree may signal intra-prediction modes for TUs of the CU individually.

Figure 5:
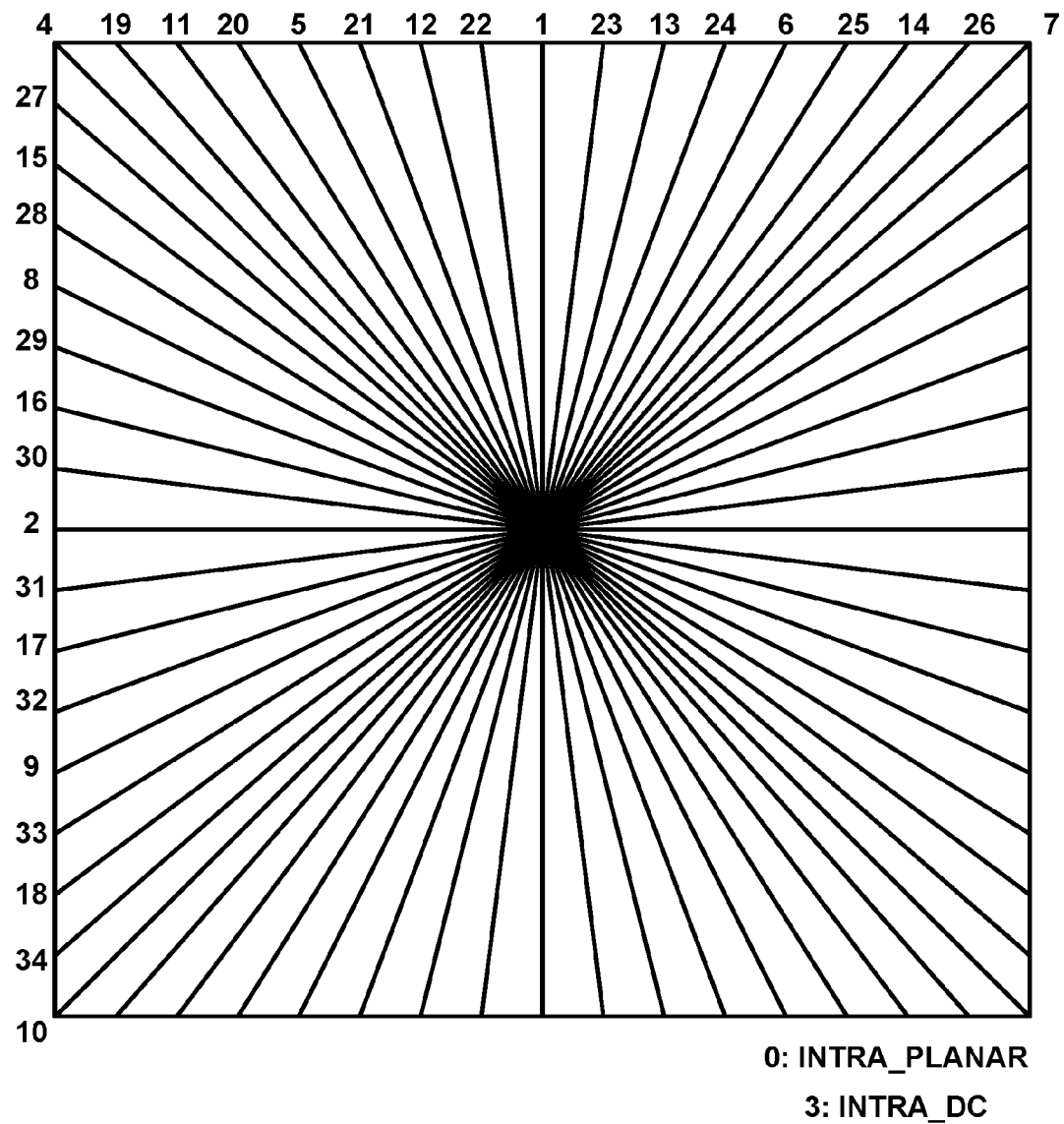
FIG. 5 is a conceptual diagram illustrating example intra-prediction mode directions.

FIG. 5 is a conceptual diagram generally illustrating the prediction directions associated with directional intra-prediction modes. For example, as noted above, the emerging HEVC standard may include thirty five intra-prediction modes, including a planar mode (mode 0), a DC mode (mode 1) and 33 directional prediction modes (modes 2-34). With planar mode, prediction is performed using a so-called "plane" function. With DC mode, prediction is performed based on an averaging of pixel values within the block. With a directional prediction mode, prediction is performed based on a neighboring block's reconstructed pixels along a particular direction (as indicated by the mode).

In some instances, a video encoding device (such as video encoder 20) may signal an intra-mode for a block using a most probable mode (MPM) process. For example, video encoder 20 may identify up to two MPM candidates associated with blocks that neighbor the block currently being coded (e.g., a block that is positioned above the block currently being encoded and a block that is positioned to the left of the block currently being encoded). In the event that the two MPM candidates cannot be found (e.g., the blocks are not intra coded, the blocks are in a different slice or outside a picture boundary, the blocks have the same intra mode), video encoder 20 may substitute DC mode.

If the intra-mode for the block currently being encoded is equal to either of the MPM candidates, video encoder 20 may set a prev_intra_luma_pred_flag. In addition, video encoder 20 may set an mpm_idx flag to identify the matching MPM candidate. If, however, the intra-mode for the block currently being encoded is not equal to either of the MPM candidates, video encoder 20 may set a rem_intra_luma_pred_mode symbol to indicate which of the remaining intra-modes is equal to the intra-mode for the block currently being encoded.

Figure 6:
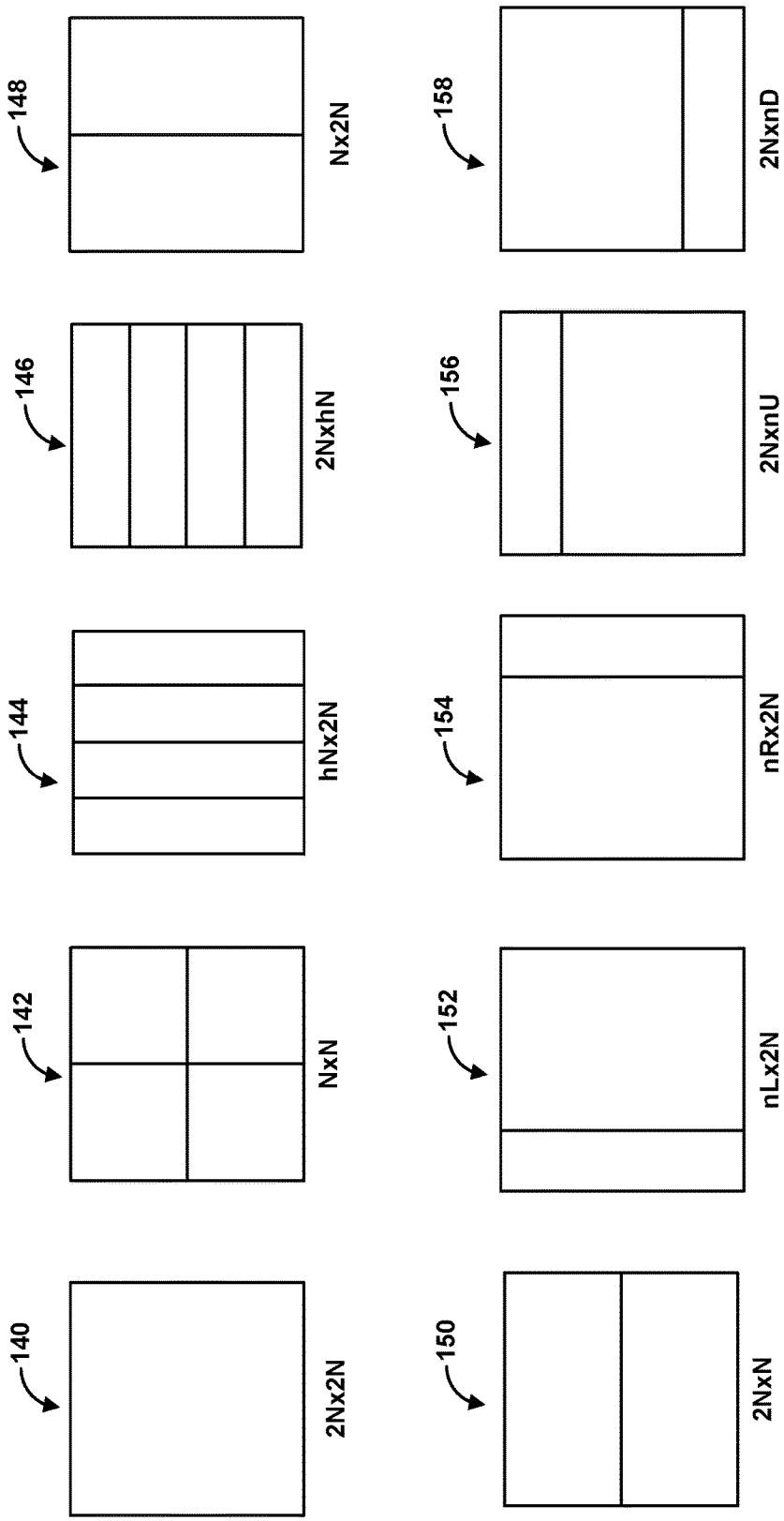
FIG. 6 is a conceptual diagram illustrating example partition modes for predicting video data.
Figure 8:
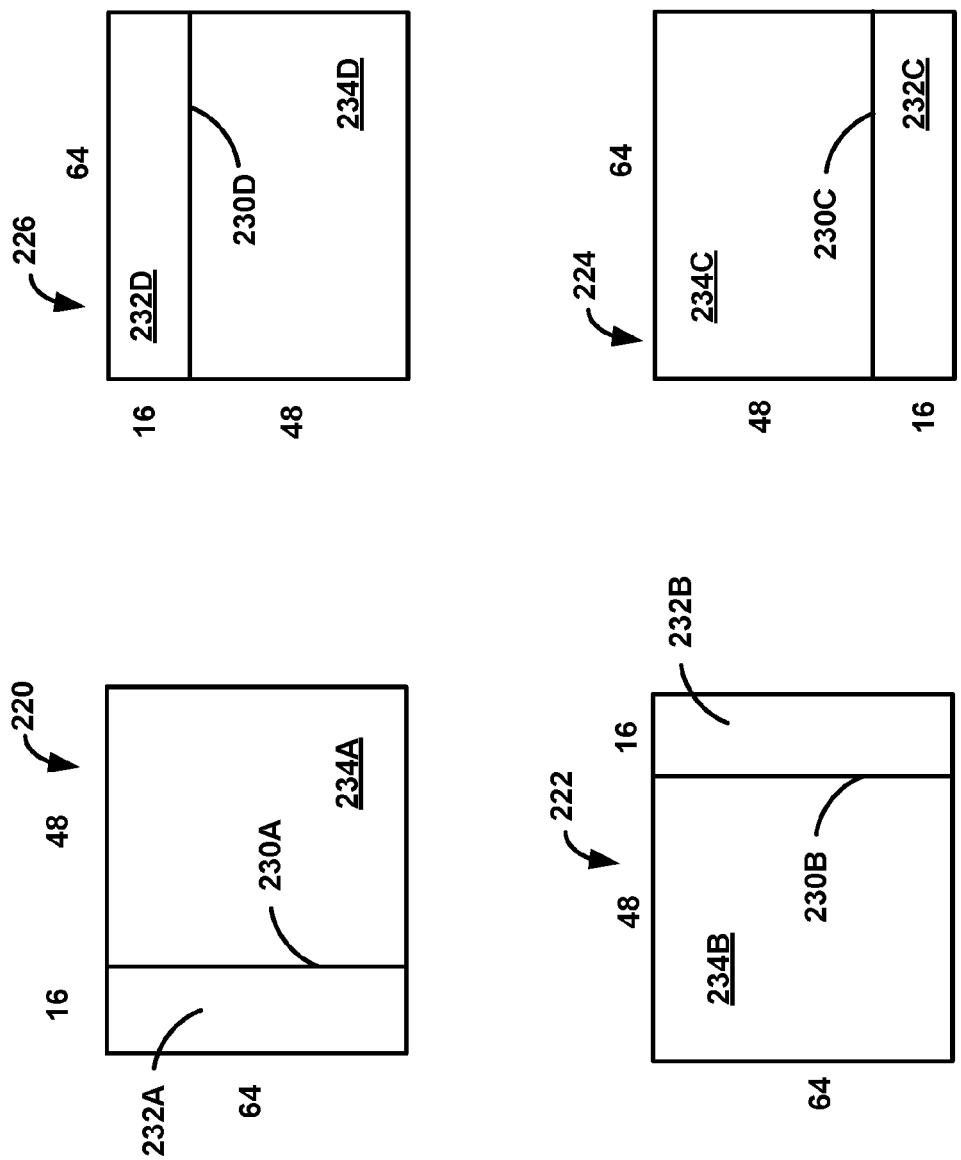
FIG. 8 is a conceptual diagram illustrating various examples of blocks partitioned using asymmetric partition modes of SDIP.

According to aspects of this disclosure, the intra-modes shown and described with respect to the example of FIG. 5 may be used in conjunction with one or more of the partitioning modes shown in FIGS. 6 and 8, including SDIP and/or asymmetric SDIP modes.

FIG. 6 generally illustrates partitioning modes (which may define PU sizes) that may be associated with prediction units. For example, assuming the size of a particular CU is 2N×2N, the CU may be predicted using partition modes 2N×2N (140), N×N (142), hN×2N (144), 2N×hN (146), N×2N (148), 2N×N (150), nL×2N (152), nR×2N (154), 2N×nU (156), and 2N×nD (158). The partition modes shown in the example of FIG. 5 are presented for purposes of illustration only, and other partition modes may be used to indicate the manner in which video data is predicted.

In some instances, a video coder (e.g., such as video encoder 20 and/or video decoder 30) may perform intra-prediction or inter-prediction using partition modes 140 and 142. For example, the video coder may predict a CU as a whole using the 2N×2N PU (partition mode 140). In another example, the video coder may predict the CU using four N×N sized PUs (partition mode 142), with each of the four sections having a potentially different prediction technique being applied.

In addition, with respect to intra-coding, the video coder may perform a technique referred to as short distance intra-prediction (SDIP). If SDIP is available, the CU may be predicted using parallel PUs (partition modes 144 and 146). That is, SDIP generally allows a CU to be divided into parallel PUs. By splitting a coding unit (CU) into non-square prediction units (PUs) the distances between the predicted and the reference pixels may be shortened. Accordingly, in some instances, the accuracy of intra prediction can be improved when applying a directional prediction method, such as directional prediction modes 2-34 shown in FIG. 5).

As an example, an 8×8 CU may be divided into four 8×2 PUs, where "N×M" refers to N pixels vertically and M pixels horizontally, in this example. The first PU may be predicted from neighboring pixels to the CU, the second PU may be predicted from neighboring pixels including pixels of the first PU, the third PU may be predicted from neighboring pixels including pixels of the second PU, and the fourth PU may be predicted from neighboring pixels including pixels of the third PU. In this manner, rather than predicting all pixels of the CU from pixels of neighboring, previously coded blocks to the CU, pixels within the CU may be used to predict other pixels within the same CU, using SDIP.

In the example, shown in FIG. 6, a CU may be predicted with four SDIP PUs in a hN×2N arrangement (partition mode 144) where "h" represents one-half. In another example, a CU may be predicted with four SDIP PUs in an 2N×hN arrangement (partition mode 146). The partitioning of the CU into SDIP PUs may be referred to as implementing SDIP partition modes. In other examples, additional prediction types may also be possible.

With respect to inter-coding, in addition to the symmetric partition modes 140 and 142, the video coder may implement a side-by-side arrangement of PUs (partition modes 148 and 150), or a variety of AMP (asymmetric motion partition) modes. With respect to the AMP modes, the video coder may asymmetrically partition a CU using partition modes nL×2N (152), nR×2N (154), 2N×nU (156), and 2N×nD (158). In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right."

FIG. 7A is a conceptual diagram illustrating a coding unit (CU) 160 that is partitioned into lines or non-square (e.g., rectangular) blocks in accordance with short distance intra-prediction (SDIP). The dimensionality of each subblock of CU 160 is called out in FIG. 7A. Video encoder 20 and/or video decoder 30 may implement one or more of the techniques described herein, such as the adaptive SDIP processing order techniques described above, when encoding or decoding CU 160.

FIG. 7B is a conceptual diagram illustrating an example LCU 180 including an SDIP-predicted CU. In particular, LCU 180 includes sub-CUs 182, 184, 186, 188, 190, 192, and 194, in this example. Each of sub-CUs 182, 184, 186, 188, 190, 192, and 194 corresponds to a leaf node CU. A non-leaf node CU would include sub-CUs 184, 186, 188, and 190 as well, in this example. Each of the leaf node sub-CUs may be predicted according to a particular prediction mode. In this example, sub-CU 188 is predicted using SDIP. Accordingly, sub-CU 188 includes four PUs 196A-196D (PUs 196). As shown in this example, PUs 196 are horizontal PUs of sub-CU 188.

FIG. 8 is a conceptual diagram illustrating various examples of blocks 220-226 partitioned using asymmetric partition modes of SDIP. For example, FIG. 6 includes two symmetric SDIP modes 144 and 146. In the example of FIG. 8, each block 220-226 is partitioned into two rectangles, where each of blocks 220-226 is originally a 2N×2N block. One rectangle has a dimension (that is, length or width) of N/2 pixels, and another rectangle has the same dimension of 3N/2 pixels.

In this example, each of the blocks 220, 222, 224, and 226, is a 64×64 pixel block, although other sizes of blocks (e.g., 32×32, 16×16, 128×128, or the like) may also be partitioned in a similar manner. Block 220 is horizontally divided by vertical edge 230A into two PUs, one (½N)*2N PU 232A and one (3/2N)*2N PU 234A. Block 222 is horizontally divided by vertical edge 230B into two PUs, one (3/2N)*2N PU 234B and one (½N)*2N PU 232B. Block 224 is vertically divided by horizontal edge 230C into two PUs, one 2N*(3/2N) PU 234C and one 2N*(½N) PU 232C. Block 226 is vertically divided by horizontal edge 230D into two PUs, one 2N*(½N) PU 232D and one 2N*(3/2N) PU 234D. In this manner, the SDIP PUs 232, 234 of FIG. 8 may be referred to as asymmetric SDIP PUs.

As with conventional SDIP, each of the pixels of an asymmetric SDIP PU may share the same intra-prediction direction. Furthermore, asymmetric SDIP PUs need not necessarily have the same intra-prediction direction. For example, PU 232A may be predicted using a vertical intra-prediction mode (e.g., mode 1 in FIG. 5), while PU 234A may be predicted using a diagonal intra-prediction mode (e.g., mode 26 in FIG. 5).

In some examples, certain intra-prediction modes may be restricted for certain asymmetric PUs. For example, video coding devices (such as video encoder 20 or video decoder 30) may be configured to infer that relatively vertical asymmetric SDIP PUs, such as PUs 232A, 232B, 234A, and 234B, are not predicted using relatively horizontal intra-prediction modes (e.g., modes 27-10, extending from top to bottom of FIG. 5). Likewise, in another example, video coding devices may be configured to infer that relatively horizontal asymmetric SDIP PUs, such as PUs 232C, 232C, 234D, and 234D, are not predicted using relatively vertical intra-prediction modes (e.g., modes 4-7, extending from left to right of FIG. 5).

In some examples, transform unit sizes may be the same as the corresponding PU size. Thus, transform units for blocks 220-226 may have the same sizes as corresponding ones of PUs 232, 234. For example, for block 220, a (½N)*2N transform may be used for PU 232A, and a (3/2N)*2N transform may be used for PU 234A. Alternatively, in other examples, the same size transforms may be used for two PUs in asymmetric SDIP. For example, for block 220, a (½N)*2N transform may be used for PU 232A, and three (½N)*2N transforms may be used for PU 234A.

Figure 9:
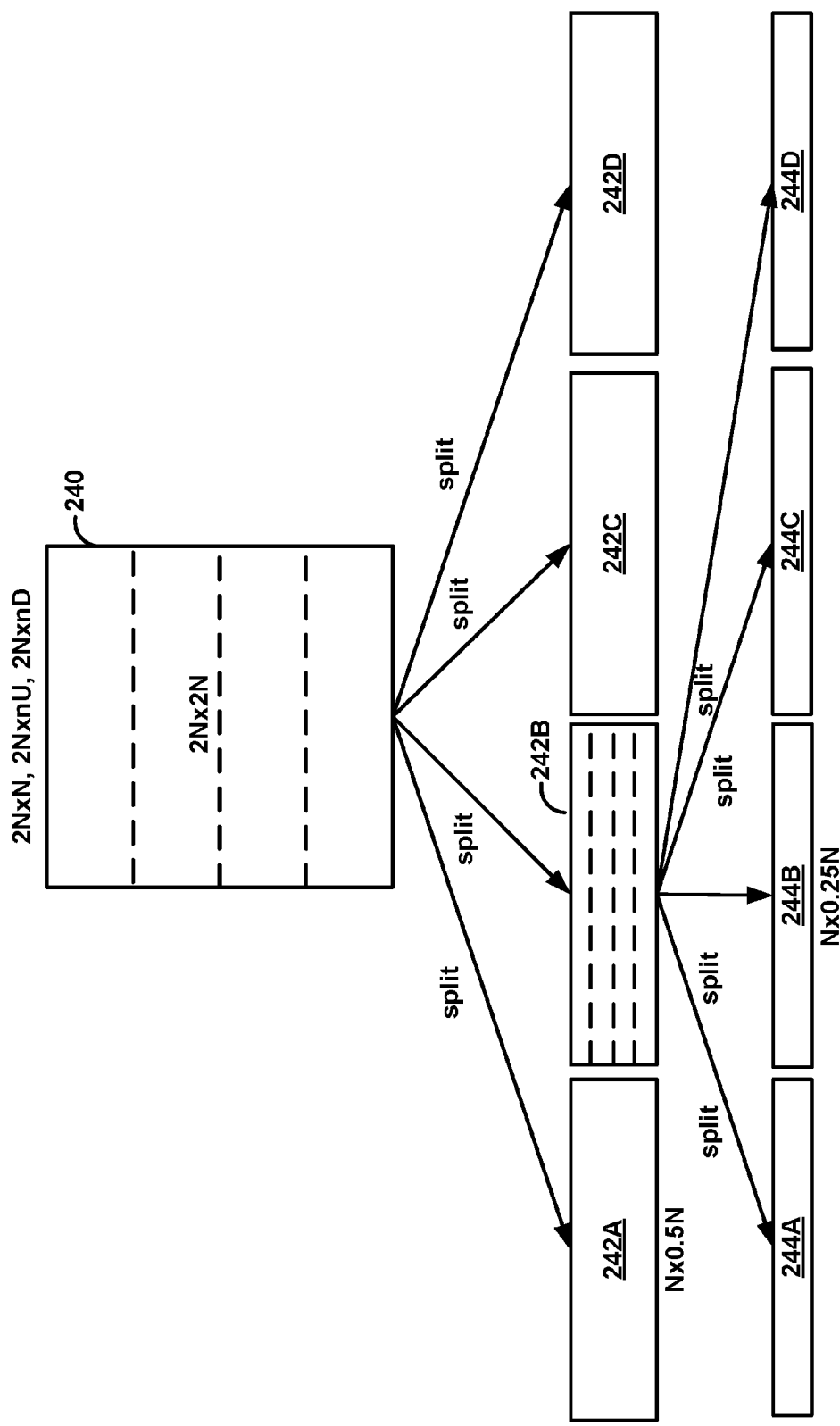
FIG. 9 is a conceptual diagram illustrating an example partitioning structure for non-square quadtree partitioning.

FIG. 9 is a conceptual diagram illustrating an example partitioning structure for non-square quadtree partitioning. As shown in FIG. 9, a block 240 may be partitioned using non-square quadtree transforms (NSQT). Generally, NSQT allows a block, such as a TU of a CU, to be partitioned into a first level of four non-square rectangles, any or all of which may be further partitioned into an additional level of four smaller, equally sized non-square rectangles. In the example of FIG. 9, a block 240 has size 2N×2N. The block may be partitioned into four 2N×(N/2) or (N/2)×2N rectangles 242A-242D. Any or all of these first level blocks 242 may be further partitioned into a second level of four smaller equally sized non-square blocks having size N×(N/4), e.g., blocks 244A-244D (blocks 244, not drawn to scale).

Although block 240 is illustrated in FIG. 9 as being partitioned into two levels of sub-blocks (242, 244), a block, such as block 240 may be partitioned into one level of blocks, which is not further partitioned. NSQT is generally used for partitioning transform units (TUs) of a block, where TUs include transform coefficients associated with residual data.

In some examples, an RQT tree structure, such as that shown in FIG. 9, may be used for an asymmetric SDIP partitioned CU. For example, for block 220 (FIG. 8), the transform for PU 232A may be either a level one TU such as a (½N)*2N TU (such as blocks 242), or four (¼N)*N TUs, e.g., four level-two TUs (such as blocks 244). The RQT may include split flag syntax elements indicating whether, for each TU, the TU is further split into sub-TUs. In this manner, the split or not split decision may be indicated by a split flag.

Figure 10A:
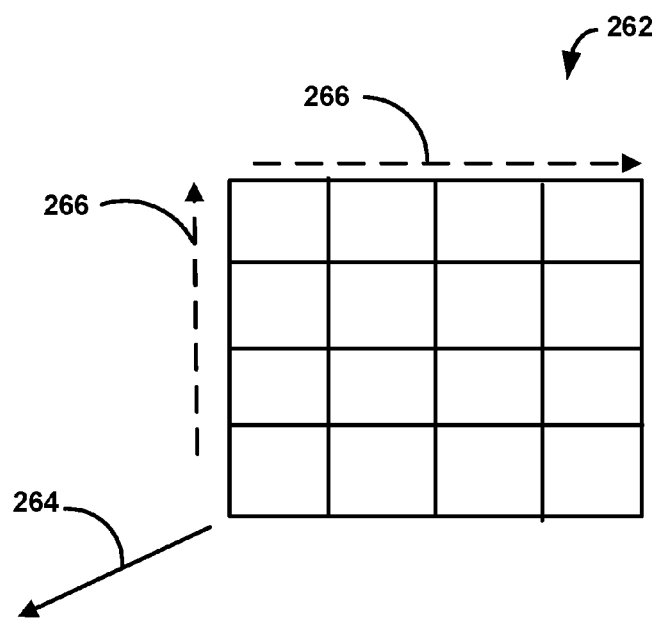
FIGS. 10A and 10B are conceptual diagrams illustrating the adaptive processing order changes that video coding devices may implement to modify SDIP-based coding, in accordance with various aspects of this disclosure.
Figure 10B:
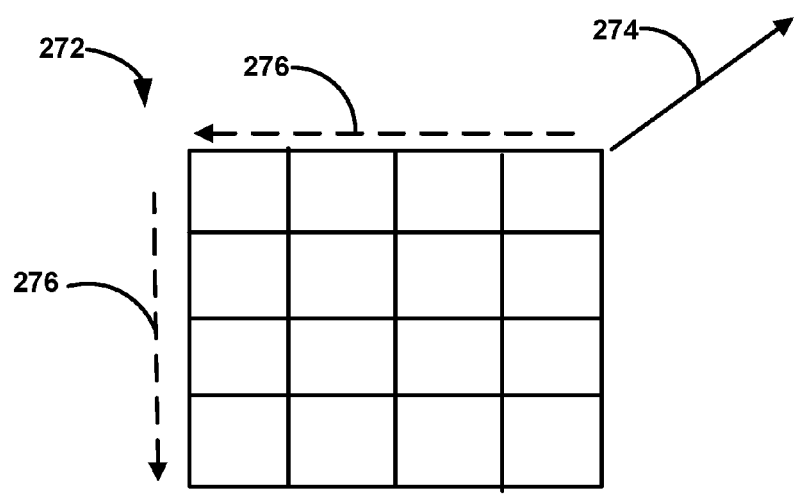

FIGS. 10A and 10B are conceptual diagrams illustrating the adaptive processing order changes that video encoder 20 and video decoder 30 may implement to modify SDIP-based coding, in accordance with various aspects of this disclosure. FIG. 10A illustrates SDIP-coded CU 262. Intra-prediction angle 264 is illustrated with a solid-lined arrow, and in the particular example of SDIP-coded CU 262, intra-prediction angle 264 is a bottom-left intra-prediction angle. Based on detecting that intra-prediction angle 264 is bottom-left, video encoder 20 and video decoder 30 may adapt the processing order of the subblocks of SDIP-coded LCU 262 to form modified processing order 266, by implementing the techniques of this disclosure. Modified processing order 266 is illustrated using two separate dashed-line arrows, with one arrow illustrating the vertical aspects of modified processing order 266, and the other arrow illustrating the horizontal aspects of modified processing order 266. In the case of SDIP coded LCU 262, based on intra-prediction angle 264 being bottom-left, video encoder 20 and video decoder 30 may form modified processing order 266 of the subblocks to be bottom-up and left-to-right. More specifically, in response to detecting that intra-prediction angle 264 is bottom-left, video encoder 20 and video decoder 30 may deviate from the top-down, left-to-right processing order of existing SDIP-based coding technology, and instead, use the bottom-up, left-to-right aspects of modified processing order 266 for SDIP-coded CU 262, according to techniques of this disclosure.

FIG. 10B illustrates SDIP-coded CU 272. Intra-prediction angle 274 is illustrated with a solid-lined arrow, and in the particular example of SDIP-coded CU 272, intra-prediction angle 274 is a top-right intra-prediction angle. Based on detecting that intra-prediction angle 274 is top-right, video encoder 20 and video decoder 30 may adapt the processing order of the subblocks of SDIP-coded LCU 272 to form modified processing order 276, by implementing the techniques of this disclosure. Modified processing order 276 is illustrated using two separate dashed-line arrows, with one arrow illustrating the vertical aspects of modified processing order 276, and the other arrow illustrating the horizontal aspects of modified processing order 276. In the case of SDIP coded LCU 272, based on intra-prediction angle 274 being top-right, video encoder 20 and video decoder 30 may form modified processing order 266 of the subblocks to be top-down and right-to-left. More specifically, in response to detecting that intra-prediction angle 274 is top-right, video encoder 20 and video decoder 30 may deviate from the top-down, left-to-right processing order of existing SDIP-based coding technology, and instead, use the top-down, right-to-left aspects of modified processing order 276 for SDIP-coded CU 272, according to techniques of this disclosure.

Figure 11:
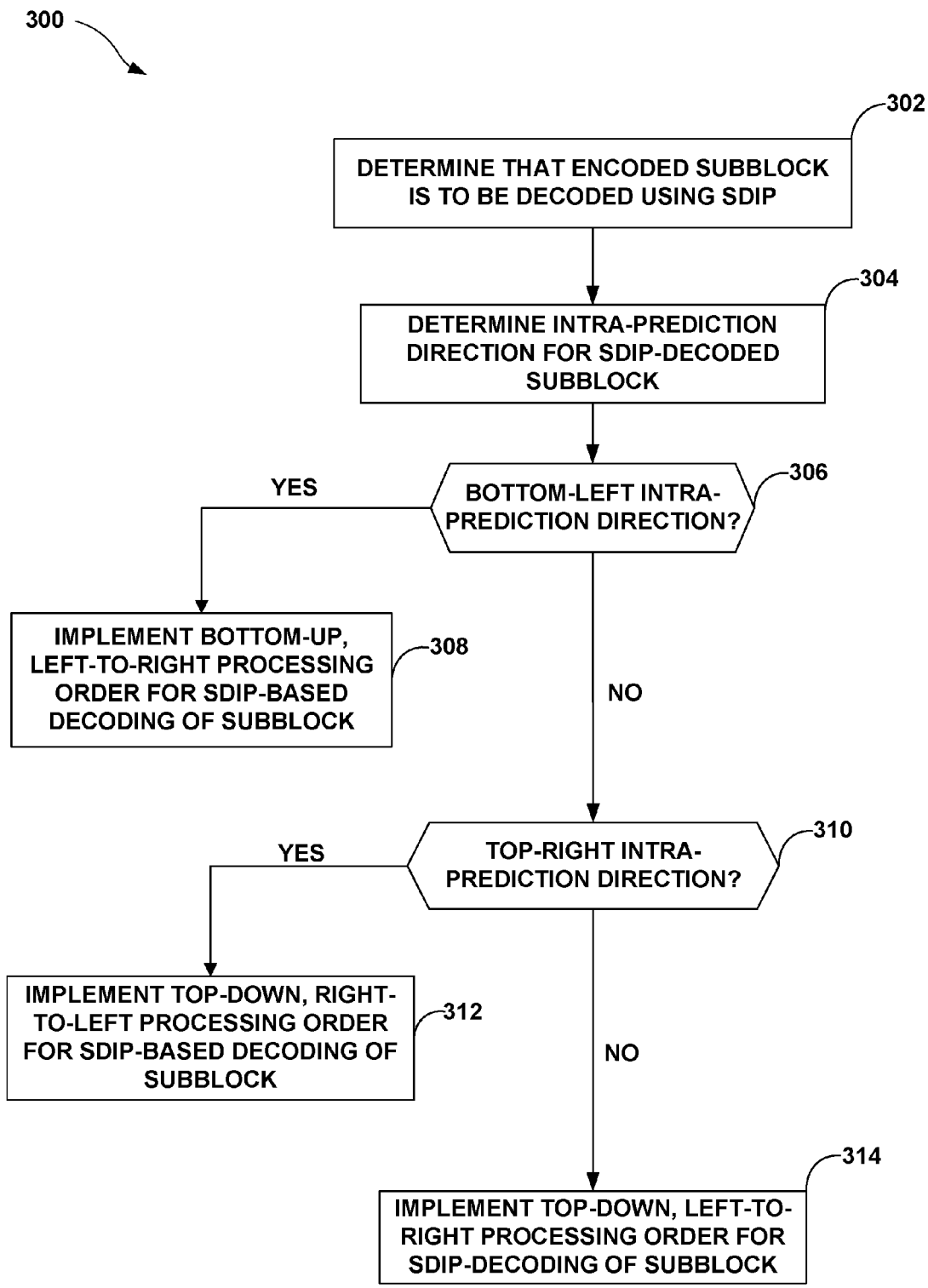
FIG. 11 is a flowchart illustrating an example process by which a video decoding device may implement techniques of this disclosure.

FIG. 11 is a flowchart illustrating an example process 300 that video decoder 30 may implement to perform one or more techniques of this disclosure. Video decoder 30 may determine that an encoded subblock of video data is to be decoded using SDIP (302). In turn, video decoder 30 may determine an intra-prediction direction for subblock that is to be decoded according to SDIP (304).

Video decoder 30 may determine whether the intra-prediction direction is a bottom-left direction (decision block 306). Based on a determination that the intra-prediction direction is the bottom-left direction (YES branch of decision block 306), video decoder 30 may implement a bottom-up, left-to-right processing order for SDIP-based decoding of the subblock (308). On the other hand, based on a determination that intra-prediction direction is not the bottom-left direction (NO branch of decision block 306), video decoder 30 may determine whether the intra-prediction direction is a top-right direction (decision block 310).

Based on a determination that the intra-prediction direction is the top-right direction (YES branch of decision block 310), video decoder 30 may implement a top-down, right-to-left processing order for SDIP-based decoding of the subblock (312). On the other hand, based on a determination that intra-prediction direction is not the top-right direction (NO branch of decision block 310), video decoder 30 may implement a top-down, left-to-right processing order for SDIP-based decoding of the subblock (314). As such, according to the techniques of this disclosure, video decoder 30 may implement the top-down, left-to-right processing order for SDIP-based decoding of the subblock if the intra-prediction angle for the SDIP mode is neither bottom-left nor top-right.

Figure 12:
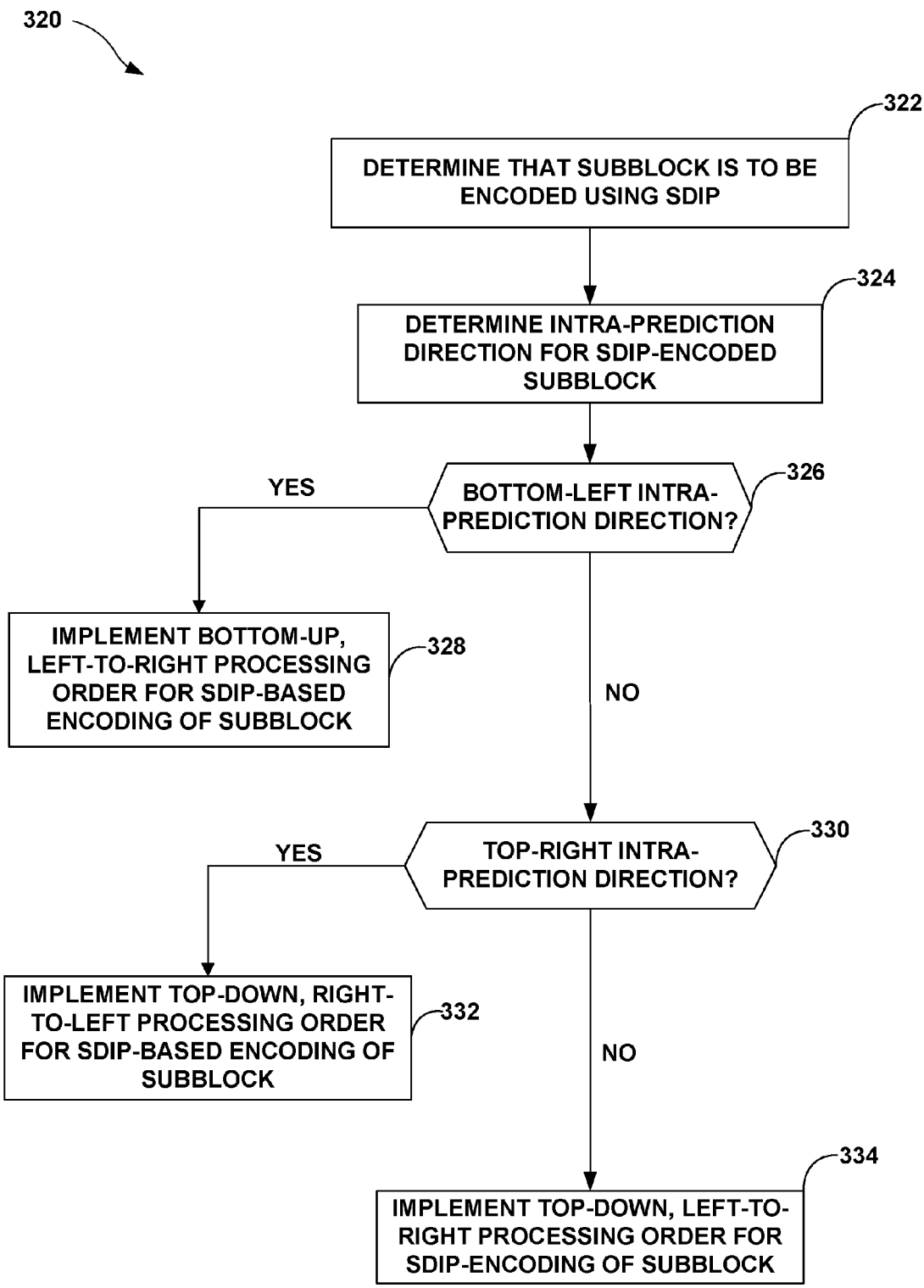
FIG. 12 is a flowchart illustrating an example process by which a video encoding device may implement techniques of this disclosure.

FIG. 12 is a flowchart illustrating an example process 320 that video encoder 20 may implement to perform one or more techniques of this disclosure. Video encoder 20 may determine that an subblock of video data is to be encoded using SDIP (322). In turn, video encoder 20 may determine an intra-prediction direction for subblock that is to be encoded according to SDIP (324).

Video encoder 20 may determine whether the intra-prediction direction is a bottom-left direction (decision block 326). Based on a determination that the intra-prediction direction is the bottom-left direction (YES branch of decision block 326), video encoder 20 may implement a bottom-up, left-to-right processing order for SDIP-based encoding of the subblock (328). On the other hand, based on a determination that intra-prediction direction is not the bottom-left direction (NO branch of decision block 326), video encoder 20 may determine whether the intra-prediction direction is a top-right direction (decision block 330).

Based on a determination that the intra-prediction direction is the top-right direction (YES branch of decision block 330), video encoder 20 may implement a top-down, right-to-left processing order for SDIP-based encoding of the subblock (332). On the other hand, based on a determination that intra-prediction direction is not the top-right direction (NO branch of decision block 330), video encoder 20 may implement a top-down, left-to-right processing order for SDIP-based encoding of the subblock (334).

Figure 13:
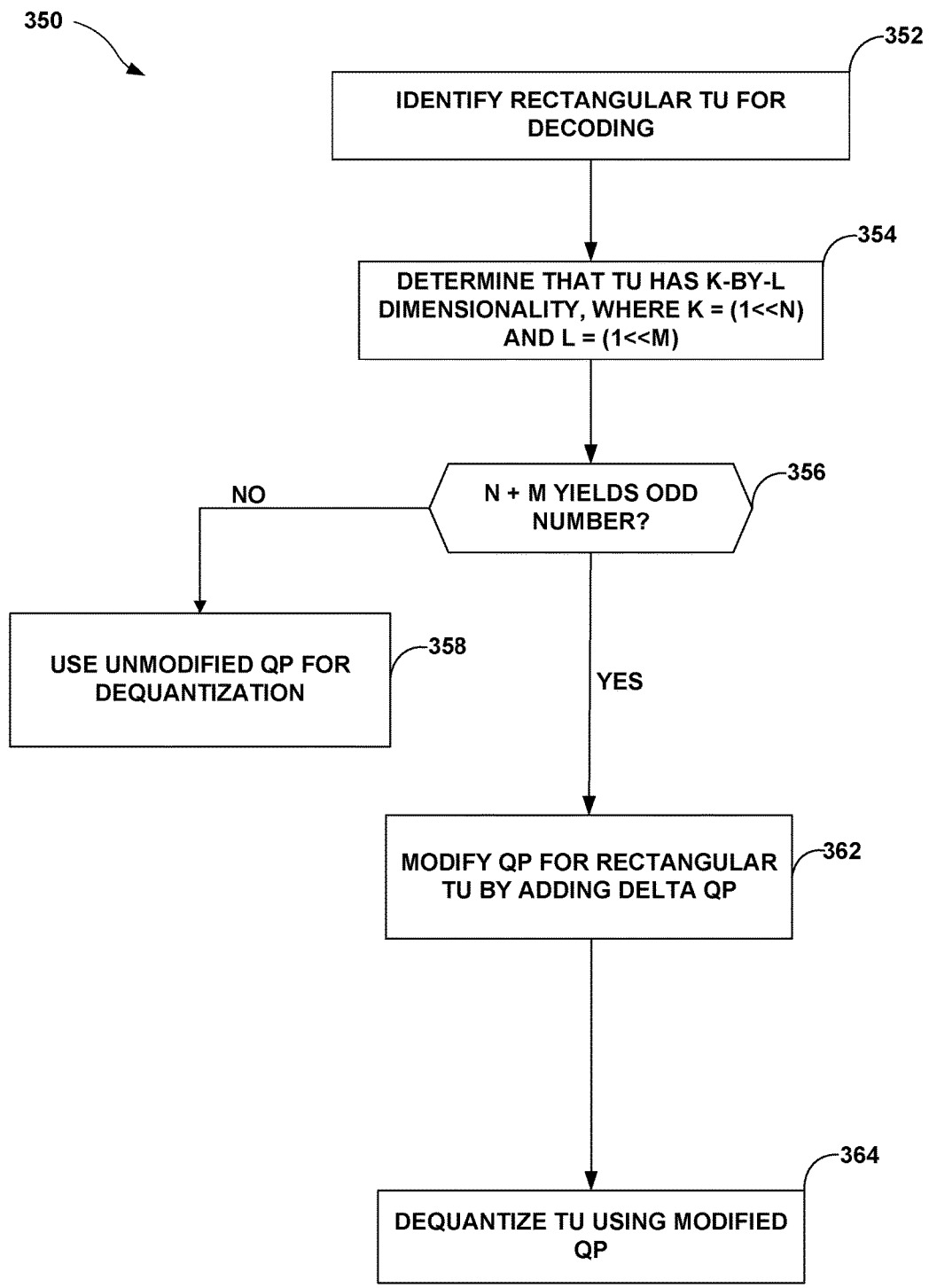
FIG. 13 is a flowchart illustrating an example process by which a video coding device may implement one or more transform manipulation techniques of this disclosure.

FIG. 13 is a flowchart illustrating an example process 350 that a video coding device may implement to perform one or more of the transform manipulation aspects of this disclosure. Process 350 is described with respect to video decoder 30 herein. Video decoder 30 may identify a rectangular transform unit (TU) for decoding (352). In turn, video decoder 30 may determine that the rectangular TU has a dimensionality of K-by-L (354). K represents the number of rows of pixels in the TU, and is an integer value obtained using the formula (1<<n), where 'n' represents an integer value. L represents the number of columns of pixels in the TU, and is an integer value obtained using the formula (1<<m), where 'm' represents an integer value. In other words, has a value equal to an integer value 'm' left shifted by one (1), and wherein L has a value equal to an integer value 'n' left shifted by one (1).

Video decoder 30 may determine whether the sum of n and m yields an odd number (decision block 356). Based on a determination that the sum of n and m does not yield an odd number (NO branch of decision block 356), video decoder 30 may use an unmodified quantization parameter (QP) value for dequantizating the TU (358). On the other hand, if video decoder 30 determines that the sum of n and m yields an odd number (YES branch of decision block 356), then video decoder 30 may modify the QP value for dequantizing the rectangular TU by adding a delta QP (362). In various examples, video decoder 30 may use a predetermined delta QP value (e.g., negative three), or may adaptively derive the delta QP value using the QP value for a square TU. In turn, video decoder 30 may dequantize the TU using the modified QP value (364).

Certain aspects of this disclosure have been described with respect to the HEVC standard and/or one or more HEVC extensions for purposes of illustration. However, the techniques described in this disclosure may be useful for other video coding processes, such as those defined according to H.264 or other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding encoded video data, the method comprising:
   determining that a rectangular transform unit (TU) comprises a number of pixel rows denoted by a first integer value 'K' and a number of pixel columns denoted by a second integer value 'L,' wherein K, when converted to a binary format, represents a binary value equal to a binary equivalent of an integer value 'm' left shifted by one (1), and wherein L, when converted to the binary format, represents a binary value equal to a binary equivalent of an integer value 'n' left shifted by one (1);
   determining that a sum of n and m is an odd number;
   based on the sum of n and m being the odd number, adding a delta quantization parameter (delta QP) value to a quantization parameter (QP) value for the rectangular TU to obtain a modified QP value for the rectangular TU; and
   dequantizing the rectangular TU using the modified QP value.

2. The method of claim 1, further comprising applying a scaling factor to pixels of the rectangular PU, the scaling factor being associated with a square transform size.

3. The method of claim 2,
   wherein the square transform size is associated with a dimensionality represented by an integer equivalent of a binary value obtained according to the expression ((n+m)>>1)-by-((n+m)>>1) performed using a binary equivalent of (n+m), and
   wherein '>>' represents an arithmetic right-shift operation.

4. The method of claim 2,
   wherein the square transform size is associated with a dimensionality represented by an integer equivalent of a binary value obtained according to the expression ((n+m+1)>>1)-by-((n+m+1)>>1) performed using a binary equivalent of (n+m+1), and
   wherein '>>' represents an arithmetic right-shift operation.

5. The method of claim 1, further comprising determining the delta QP value based on a QP value of a square transform with a K-by-K dimensionality.

6. The method of claim 1, further comprising determining that the delta QP value is a value of −3 (negative three).

7. A video decoding device comprising:
   a memory device configured to store encoded video data; and
   processing circuitry coupled to the memory device and being configured to:
   determine that a rectangular transform unit (TU) of the encoded video data stored to the memory device comprises a number of pixel rows denoted by a first integer value 'K' and a number of pixel columns denoted by a second integer value 'L,' wherein K, when converted to a binary format, represents a binary value equal to an integer value 'm' left shifted by one (1), and wherein L, when converted to the binary format, represents a binary value equal to a binary equivalent of an integer value 'n' left shifted by one (1);
   determine that a sum of n and m is an odd number;
   based on the sum of n and m being the odd number, add a delta quantization parameter (delta QP) value to a quantization parameter (QP) value for the rectangular TU to obtain a modified QP value for the rectangular TU; and
   dequantize the rectangular TU using the modified QP value.

8. The video decoding device of claim 7, wherein the processing circuitry is further configured to apply a scaling factor to pixels of the rectangular PU, the scaling factor being associated with a square transform size.

9. The video decoding device of claim 8,
   wherein the square transform size is associated with a dimensionality represented by an integer equivalent of a binary value obtained according to the expression ((n+m)>>1)-by-((n+m)>>1) performed using a binary equivalent of (n+m), and
   wherein '>>' represents an arithmetic right-shift operation.

10. The video decoding device of claim 8,
    wherein the square transform size is associated with a dimensionality represented by an integer equivalent of a binary value obtained according to the expression ((n+m+1)>>1)-by-((n+m+1)>>1) performed using a binary equivalent of (n+m+1), and
    wherein '>>' represents an arithmetic right-shift operation.

11. The video decoding device of claim 7, wherein the processing circuitry is further configured to determine the delta QP value based on the QP value.

12. The video decoding device of claim 7, wherein the processing circuitry is further configured to determine that the delta QP value is a value of −3 (negative three).

13. The video decoding device of claim 7, further comprising a display configured to display one or more pictures that are reconstructed using the modified QP value and the rectangular TU.

14. A non-transitory computer-readable storage medium comprising instructions that, when executed, cause processing circuitry of a video decoding device to:
  store encoded video data;
  determine that a rectangular transform unit (TU) of the encoded video data stored to the non-transitory computer-readable storage medium comprises a number of pixel rows denoted by a first integer value 'K' and a number of pixel columns denoted by a second integer value 'L,' wherein K, when converted to a binary format, represents a binary value equal to an integer value 'm' left shifted by one (1), and wherein L, when converted to the binary format, represents a binary value equal to a binary equivalent of an integer value 'n' left shifted by one (1);
  determine that a sum of n and m is an odd number;
  based on the sum of n and m being the odd number, add a delta quantization parameter (delta QP) value to a quantization parameter (QP) value for the rectangular TU to obtain a modified QP value for the rectangular TU; and
  dequantize the rectangular TU using the modified QP value.

15. The non-transitory computer-readable storage medium of claim 14, further comprising instructions that, when executed, cause the processing circuitry to apply a scaling factor to pixels of the rectangular PU, the scaling factor being associated with a square transform size.

16. The non-transitory computer-readable storage medium of claim 15,
  wherein the square transform size is associated with a dimensionality represented by an integer equivalent of a binary value obtained according to the expression ((n+m)>>1)-by-((n+m)>>1) performed using a binary equivalent of (n+m), and
  wherein '>>' represents an arithmetic right-shift operation.

17. The non-transitory computer-readable storage medium of claim 15,
  wherein the square transform size is associated with a dimensionality represented by an integer equivalent of a binary value obtained according to the expression ((n+m+1)>>1)-by-((n+m+1)>>1) performed using a binary equivalent of (n+m+1), and
  wherein '>>' represents an arithmetic right-shift operation.

18. The non-transitory computer-readable storage medium of claim 14, further comprising instructions that, when executed, cause the processing circuitry to determine the delta QP value based on a QP value of a square transform with a K-by-K dimensionality.

19. The non-transitory computer-readable storage medium of claim 14, further encoded with instructions that, when executed, cause the processing circuitry to determine that the delta QP value is a value of −3 (negative three).

* * * * *